US011373640B1

(12) United States Patent
Chen et al.

(10) Patent No.: US 11,373,640 B1
(45) Date of Patent: Jun. 28, 2022

(54) INTELLIGENT DEVICE GROUPING

(71) Applicant: Amazon Technologies, Inc., Seattle, WA (US)

(72) Inventors: Zeya Chen, Charlottesville, VA (US); Charles Edwin Ashton Brett, Seattle, WA (US); Jay Patel, Seattle, WA (US); Lizhen Peng, Seattle, WA (US); Aniruddha Basak, Seattle, WA (US); Hongyang Wang, Seattle, WA (US); Sara Hillenmeyer, Seattle, WA (US); Yunfeng Jiang, Seattle, WA (US); Sven Eberhardt, Seattle, WA (US); Akshay Kumar, Seattle, WA (US); William Evan Welbourne, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 162 days.

(21) Appl. No.: 16/052,546

(22) Filed: Aug. 1, 2018

(51) Int. Cl.
*G10L 15/22* (2006.01)
*G10L 15/18* (2013.01)
*H04L 41/0893* (2022.01)
*G06F 3/16* (2006.01)
*G06N 7/00* (2006.01)
*G06F 40/30* (2020.01)
*H04L 67/306* (2022.01)

(52) U.S. Cl.
CPC .......... *G10L 15/1815* (2013.01); *G06F 3/167* (2013.01); *G06F 40/30* (2020.01); *G06N 7/005* (2013.01); *G10L 15/22* (2013.01); *H04L 41/0893* (2013.01); *G10L 2015/223* (2013.01); *H04L 67/306* (2013.01)

(58) Field of Classification Search
CPC ... G10L 15/22; G10L 2015/223; G10L 15/18; G06F 3/167; G06F 16/9535
See application file for complete search history.

(56) References Cited

U.S. PATENT DOCUMENTS

| 9,286,391 | B1 * | 3/2016 | Dykstra | G06F 16/285 |
|---|---|---|---|---|
| 9,565,521 | B1 * | 2/2017 | Srinivasan | H04M 1/73 |
| 9,918,351 | B2 * | 3/2018 | Kim | H04W 76/15 |
| 10,970,948 | B2 * | 4/2021 | Gideon, III | H04L 63/105 |
| 2002/0065944 | A1 * | 5/2002 | Hickey | G06F 9/54 |
| | | | | 719/310 |
| 2010/0057470 | A1 * | 3/2010 | Silvera | G10L 15/26 |
| | | | | 704/275 |
| 2010/0292961 | A1 * | 11/2010 | Moss | G01D 4/002 |
| | | | | 702/188 |
| 2011/0301890 | A1 * | 12/2011 | Shirriff | G01R 31/392 |
| | | | | 702/63 |
| 2012/0232886 | A1 * | 9/2012 | Capuozzo | G10L 15/22 |
| | | | | 704/9 |

(Continued)

*Primary Examiner* — Jakieda R Jackson
(74) *Attorney, Agent, or Firm* — Lee & Hayes, P.C.

(57) ABSTRACT

Systems and methods for intelligent device grouping are disclosed. An environment, such as a home, may have a number of voice-enabled devices and accessory devices that may be controlled by the voice-enabled devices. One or more models, such as linguistics model(s) and/or device affinity models may be utilized to determine which accessory devices are candidates for inclusion in a device group, and a recommendation for grouping the devices may be provided. Device-group naming recommendations may also be generated and may be sent to users.

19 Claims, 10 Drawing Sheets

(56) References Cited

U.S. PATENT DOCUMENTS

| | | | |
|---|---|---|---|
| 2013/0183944 A1* | 7/2013 | Mozer | H04L 12/282 455/414.1 |
| 2014/0049651 A1* | 2/2014 | Voth | H04N 21/2543 348/189 |
| 2014/0108019 A1* | 4/2014 | Ehsani | H04L 12/282 704/275 |
| 2015/0186394 A1* | 7/2015 | Wu | G06F 16/3322 709/203 |
| 2015/0237071 A1* | 8/2015 | Maher | H04L 67/1068 726/1 |
| 2015/0341453 A1* | 11/2015 | Miller | H04L 67/22 709/204 |
| 2015/0348554 A1* | 12/2015 | Orr | G05B 15/02 704/275 |
| 2016/0119675 A1* | 4/2016 | Voth | H04N 21/4532 725/14 |
| 2016/0217790 A1* | 7/2016 | Sharifi | G10L 15/285 |
| 2016/0224652 A1* | 8/2016 | Schwartz | G06F 16/285 |
| 2016/0239868 A1* | 8/2016 | Demsey | H04L 67/1097 |
| 2016/0342906 A1* | 11/2016 | Shaashua | H04W 4/029 |
| 2017/0090864 A1* | 3/2017 | Jorgovanovic | G10L 21/0332 |
| 2017/0245125 A1* | 8/2017 | Child | H04W 4/12 |
| 2017/0351749 A1* | 12/2017 | Quirk | G06F 16/316 |
| 2017/0364239 A1* | 12/2017 | Gould | G06F 3/04817 |
| 2018/0075115 A1* | 3/2018 | Murray | G06F 16/2456 |
| 2018/0121825 A1* | 5/2018 | Kumar | G06F 40/56 |
| 2018/0122378 A1* | 5/2018 | Mixter | H04L 67/306 |
| 2018/0190264 A1* | 7/2018 | Mixter | H04L 67/26 |
| 2018/0190285 A1* | 7/2018 | Heckmann | G06F 1/203 |
| 2018/0191746 A1* | 7/2018 | De Knijf | H04L 63/102 |
| 2018/0227273 A1* | 8/2018 | Shumsker | H04M 3/436 |
| 2018/0234326 A1* | 8/2018 | Swierk | H04L 43/16 |
| 2018/0341839 A1* | 11/2018 | Malak | G06F 40/30 |
| 2018/0365898 A1* | 12/2018 | Costa | G06F 3/011 |
| 2018/0376528 A1* | 12/2018 | Lee | H04W 4/80 |
| 2019/0065471 A1* | 2/2019 | Comeau | G06F 16/313 |
| 2019/0361579 A1* | 11/2019 | Srivastava | A61B 5/746 |
| 2020/0007411 A1* | 1/2020 | Arar | G06F 9/00 |
| 2020/0126551 A1* | 4/2020 | Xiong | G06N 20/00 |

* cited by examiner

INTELLIGENT DEVICE GROUPING

BACKGROUND

Smart home devices have become ubiquitous. Generally, users of these devices control them independently. The ability to control multiple smart home devices with one command may be desired. Described herein are improvements in technology and solutions to technical problems that can be used to, among other things, assist in associating smart home devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
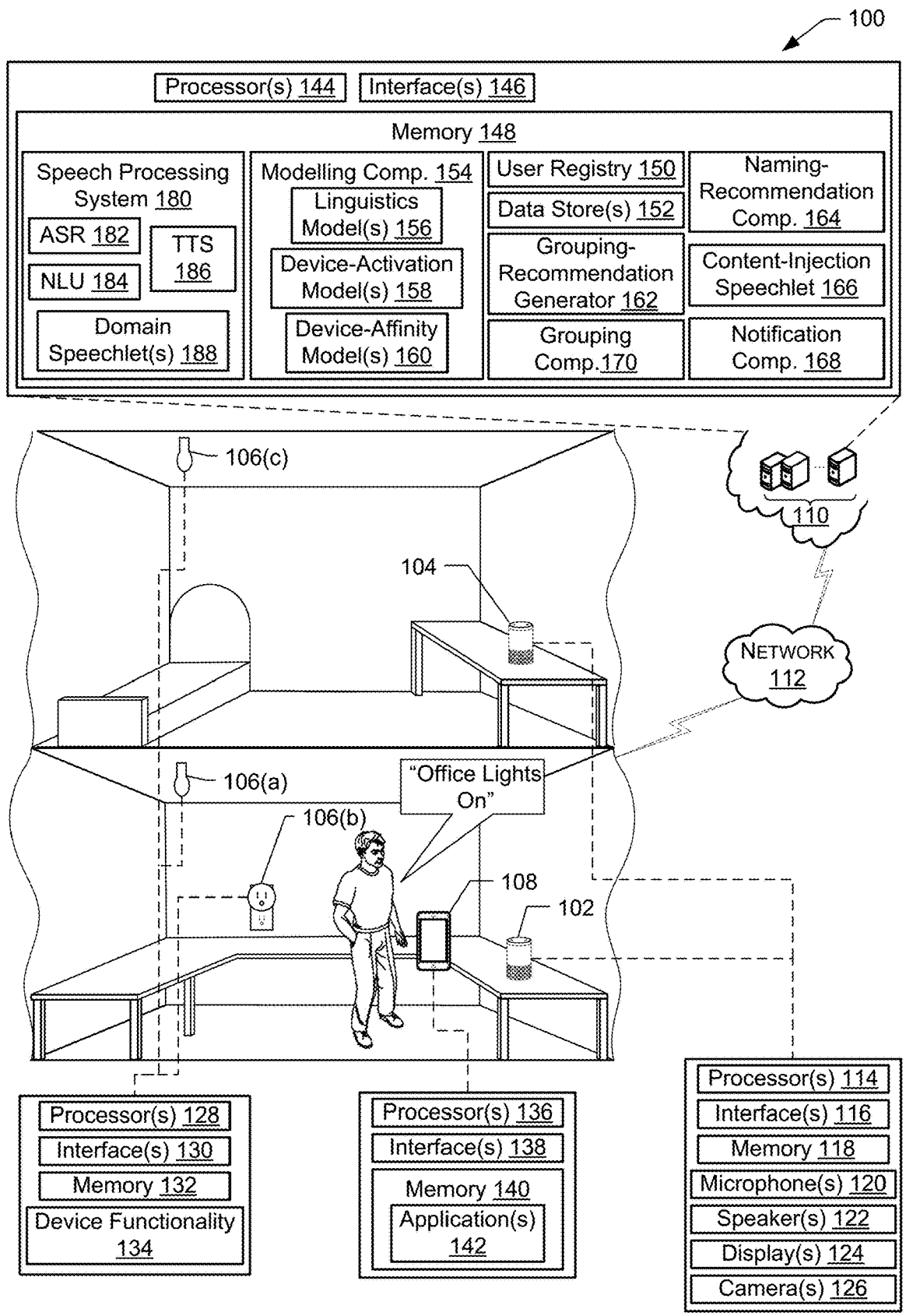
FIG. 1 illustrates a schematic diagram of an example environment for intelligent device grouping.

Systems and methods for intelligent device grouping are disclosed. Take, for example, an environment, such as a home, that includes a voice-enabled device. A user located in the home may speak user utterances, such as commands, to the voice-enabled device, and the voice-enabled device and/or an associated remote system may cause actions to be performed based on the commands. Additionally, the home may include one or more smart accessory devices, such as light bulbs, plugs, locks, cameras, televisions, appliances, automobiles, mobile devices such as phones, tablets, and/or laptops, other computing devices, wearable devices such as smart watches and/or earbuds, robotic appliances such as vacuums and/or lawn mowers, thermostats, camera, motion sensory, floodlights, doorbells, etc. The voice-enabled device may be configured to operate the accessory devices based on voice commands provided by the user. For example, the user may say "turn on Bedroom Light A." Microphones of the voice-enabled device may capture audio corresponding to this user utterance and may generate audio data. The audio data may be sent to a remote system for speech processing and the remote system may send directive data back to the voice-enabled device directing the voice-enabled device to perform the action of causing an accessory device with the naming indicator of "Bedroom Light A" to be turned on.

In examples, a certain environment may include multiple accessory devices that may be utilized together. For example, a bedroom may include two lamps, each plugged into a smart plug, and two smart ceiling light bulbs. A user may provide commands to individually operate these accessory devices, such as by saying, sequentially, "turn on Lamp 1," "turn on Lamp 2," "turn on Light 1," and "turn on Light 2." However, doing so means the user provides four instructions to get the desired action of turning on all of the accessory devices in the room.

Described herein are systems and methods to determine which accessory devices may be related as device groups and providing recommendations to users to generate and/or utilize such device groups. For example, historical data indicating user behavior may be utilized to identify which devices are operated at or near the same time. Such devices may be candidates for addition to a preexisting device group and/or for generation of a new device group. By way of example, a user may frequently provide user utterances to "turn on Light 1" and "turn on Light 2" near the same time and/or within a threshold amount of time, such as within 30 seconds. This usage pattern may be utilized to determine that the user may desire to create a device group that includes the accessory device with the naming indicator of "Light 1" and the accessory device with the naming indicator of "Light 2."

Additionally, or alternatively, linguistics models may be utilized to determine semantic similarities between naming indicators for accessory devices. For example, an accessory device with the naming indicator of "Living Room Lamp A" and another accessory device with the naming indicator of "Living Room Lamp B" may be determined to have a high degree of semantic similarity and thus these accessory devices may be candidates for addition to a preexisting device group and/or for generation of a new device group. The linguistics models may associate words making up the naming indicators to more accurately determine semantic similarity. For example, "Couch Light" and "Sofa Light" only contain the overlapping word "light." However, the linguistics models may be configured to determine a semantic similarity between "couch" and "sofa" when determining if the accessory devices may be related as a device group.

Additionally, or alternatively, device-affinity models may be utilized to determine which voice-enabled device is utilized most frequently with respect to given accessory devices. For example, the environment may include two or more voice-enabled devices, say one in a bedroom and one in a kitchen. The bedroom voice-enabled device may be frequently utilized to operate certain accessory devices, such as, for example, smart lights located in the bedroom and/or door locks. The kitchen voice-enabled device may be frequently utilized to operate other accessory devices, such as, for example, appliances located in the kitchen. The device-affinity models may determine a frequency at which such voice-enabled devices are utilized to operate the accessory devices. In examples where at least two of the accessory devices are operated frequently from a given voice-enabled device, those accessory devices may be candidates for addition to a preexisting device group and/or for generation of a new device group. In examples, the methods and/or models described above may be utilized independent of each other or some or all of the methods and/or models may be utilized together to determine which accessory devices are candidates for device groups.

Once accessory devices are determined to be candidates for device groups, recommendation data representing a recommendation may be generated. The recommendation may identify the accessory devices and provide an indication that the accessory devices are candidates for a device group. The recommendation may be presented audibly, such as via speakers of the voice-enabled device, and/or the recommendation may be presented visually, such as via a screen of the voice-enabled device, if equipped, and/or via an application residing on a mobile device associated with the voice-enabled device. A user may provide input confirming a desire to add the accessory devices to a preexisting group and/or to generate a new group, and upon receiving input data corresponding to the user input, the remote system may associate the accessory devices as a device group. Thereafter, the user may provide one user utterance to operate the accessory devices and the voice-enabled device may cause the accessory devices to operate.

Additionally, or alternatively, device-group naming recommendations may be generated. For example, when recommending the creation of a new device group, it may be advantageous to recommend a naming indicator for the device group. In other examples, when a preexisting group has been established, it may be advantageous to recommend a different naming indicator than the current naming indicator. The systems described herein may identify words associated with accessory device naming indicators and may identify common and/or similar words as between the naming indicators. The common words may be utilized to generate recommendation data representing a recommendation for a naming indicator for a device group. For example, if a voice-enabled device is associated with accessory devices having naming indicators of "Bedroom Lamp 1," "Bedroom Lamp 2," and "Bedroom Light 1," "Bedroom Light 2," the system may identify "bedroom" as a common word as between the naming indicators and may generate recommendation data representing a recommendation to name a device group associated with these accessory devices as "Bedroom Lights."

Additionally, or alternatively, using one of more of the methods and/or models described above, the remote system may cause accessory devices to be associated as a device group without requesting confirmation from a user. A naming indicator may also be determined and may be associated with the device group. In this way, "hidden groups" may be created. In these examples, a user may provide a user utterance such as "turn on bedroom lights" even when the user has not set up a group of accessory devices with the naming indicator "bedroom lights." However, the remote system may have generated a hidden group and associated the naming indicator "bedroom lights," or a similar naming indicator, with the hidden group. As such, the remote system may process audio data corresponding to the user utterance and generate directive data directing the voice-enabled device from which the audio data was received to operate the accessory devices associated with the "bedroom lights" group.

Additionally, or alternatively, the remote system may utilize timing data to influence the determination of whether accessory devices should be recommended to be grouped. For example, the remote system, using the timing data, may determine that two or more accessory devices are operated during the same time of day. By way of example, accessory devices located in the kitchen may be operated frequently between 7:00 am and 8:00 am during weekdays while accessory devices located in a bedroom may be operated frequently between 9:00 pm and 10:00 pm during weekdays. This information may be utilized to determine that a recommendation should be sent to associate the bedroom accessory devices with each other as a device group, and a recommendation should be sent to associate the kitchen accessory devices with each other as another device group.

Additionally, or alternatively, the remote system may receive response data representing user responses to recommendations to group devices. In these examples, some users may find such recommendations helpful and may respond positively. Other users may find such recommendations unhelpful and/or may respond negatively. User profiles associated with these users may be clustered to more accurately generate device group recommendations and/or to determine a frequency at which to generate and/or send such recommendations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for intelligent device grouping and group naming recommendations. The system 100 may include, for example, a first voice-enabled device 102 and a second voice-enabled device 104. The first voice-enabled device 102 and/or the second voice-enabled device 104 may be configured to receive user utterances and perform operations in response to such user utterances. In these examples, the first voice-enabled device 102 and/or the second voice-enabled device 104 may be "hands free" such that interactions with the devices are performed through audible requests and responses. The first voice-enabled device 102 may be located or otherwise situated in a first space and/or environment. The second voice-enabled device 104 may be located or otherwise situated in a second space and/or environment. As shown by way of example in FIG. 1, the first voice-enabled device 102 is located in an "office" while the second voice-enabled device 104 is located in a "bedroom." It should be understood that the devices may be located in spaces other than those specifically mentioned in this disclosure. It should also be understood that while the spaces depicted in FIG. 1 are rooms, the spaces and environments may be any space and/or environment.

The system 100 may also include one or more accessory devices 106(a)-106(c). The accessory devices 106(a)-(c) may be described as "smart" devices, which may have certain computing components and be configured to send and/or receive data from other devices. The accessory devices 106(a)-(c) may be, for example, light bulbs, plugs, locks, televisions, appliances, doorbells, cameras, automobiles, mobile devices such as phones, tablets, and/or laptops, other computing devices, wearable devices such as smart watches and/or earbuds, robotic appliances such as vacuums and/or lawn mowers, thermostats, camera, motion sensory, floodlights, doorbells, etc. As shown in FIG. 1, the first environment in which the first voice-enabled device 102 is situated may include a first accessory device 106(a), which may be a light bulb, and a second accessory device 106(b), which may be a plug. The accessory devices 106(a)-(c) may be "paired" or otherwise associated with the first voice-enabled device 102 and/or the second voice-enabled device 104. As such, the accessory devices 106(a)-(c) may be configured to send data to and/or receive data from the voice-enabled devices 102, 104. Likewise, the second environment in which the second voice-enabled device 104 is situated may include a third accessory device 106(c), which may be a light bulb. The third accessory device 106(c) may be paired or otherwise associated with the voice-enabled devices 102, 104.

The system 100 may also include a personal device 108, which may include a mobile device such as a mobile phone. The personal device 108 may be associated with the voice-enabled devices 102, 104 and/or the accessory device 106(a)-(c). In these examples, the personal device 108 may be configured to send data to and/or receive data from the voice-enabled devices 102, 104 and/or the accessory devices 106(a)-(c).

The first voice-enabled device 102, the second voice-enabled device 104, the accessory devices 106(a)-(c), and/or the personal device 108 may be configured to send data to and/or receive data from a remote system 110, such as via a network 112. In examples, one or more of the component of the system 100 may communicate directly with the remote system 110, via the network 112. In other examples, one or more of the accessory devices 106(a)-(c) may communicate with one or more of the voice-enabled devices 102, 104, and the voice-enabled devices 102, 104 may communicate with the remote system 110. Additionally, the personal device 108 may communicate directly with the voice-enabled devices 102, 104, the accessory devices 106(a)-(c), and/or the remote system 110. In further examples, a hub device, which is not shown in FIG. 1, may be utilized by the accessory devices 106(a)-(c) and/or the voice-enabled devices 102, 104 to send data to and/or receive data from other devices.

The first voice-enabled device 102 and/or the second voice-enabled device 104 may include one or more components, such as, for example, one or more processors 114, one or more network interfaces 116, memory 118, one or more microphones 120, one or more speakers 122, one or more displays 124, and/or one or more cameras 126. The microphones 120 may be configured to capture audio, such as user utterances, and generate corresponding audio data. The speakers 122 may be configured to output audio, such as audio corresponding to audio data received from another device and/or the remote system 110. The displays 124 may be configured to present images, such as images corresponding to image data received from another device and/or the remote system 110. The cameras 126 may be configured to capture images and to generate corresponding image data.

The accessory devices 106(a), 106(b), and/or 106(c) may include one or more components, such as, for example, one or more processors 128, one or more network interfaces 130, memory 132, and/or device functionality components 134. The memory 132 and/or processors 128 may be utilized to cause certain operations to be performed by the accessory devices 106(a)-(c), such as activating and/or deactivating the device functionality components 134. The device functionality components 134 may include components associated with the intended use of the accessory devices 106(a)-(c). For example, the first accessory device 106(a) may be a light bulb, and in this example, the device functionality components 134 may include a filament and/or light emitting diode that may produce and/or emit light. By way of further example, the second accessory device 106(b) may be a wall plug, and in this example, the device functionality components 134 may include an "on/off mechanism" for causing electricity to flow or not flow to a device that is plugged in to the wall plug. It should be noted that the device functionality components 134 illustrated here are by way of example only.

The personal device 108 may include one or more components such as, for example, one or more processors 136, one or more network interfaces 138, and memory 140. The memory 140 may include one or more components, such as, for example, one or more applications 142. The applications 142 may reside on the memory 140 of the personal device 108 and/or the applications 142 may reside elsewhere, such as with the remote system 110, and may be accessible via the personal device 108. The applications 142 may be configured to cause the processors 136 to display one or more user interfaces associated with operations of the voice-enabled devices 102, 104 and/or the accessory devices 106(a)-(c). The user interfaces may be utilized to receive inputs from the user of the personal device 108 and/or to provide content to the user.

The remote system 110 may include components such as, for example, one or more processors 144, one or more network interfaces 146, and memory 148. The memory 148 may include components such as, for example, a speech processing system 180, which may include an automatic speech recognition (ASR) component 182, a natural language understanding (NLU) component 184, a text-to-speech (TTS) component 186, and one or more domain speechlets 188. Additionally, the speech processing system 180 and/or another system such as a smart-home system of the remote system 110 may include a user registry 150, one or more data stores 152, a modelling component 154, a grouping-recommendation generator 162, a naming-recommendation generator 164, a content-injection speechlet 166, a notification component 168, and/or a grouping component 170. Each of the components described herein with respect to the remote system 110 may be associated with their own systems, and/or some or all of the components may be associated with a single system. The components of the memory 148 are described in detail below.

For example, the ASR component 182 may receive audio data representing a user utterance, such as from the voice-enabled device 102, and may perform automatic speech recognition to generate corresponding text data. The NLU component 184 may receive the text data, such as from the ASR component 182, and may perform natural language understanding techniques to generate corresponding intent data. The intent data and/or other commands and/or instructions may be utilized by the speech processing system 180 to determine a domain speechlet 188 to process and respond to the user utterance. The ASR component 182, the NLU component 183, and domain speechlets 188 are described in more detail with respect to FIG. 10, below. Additionally, the TTS component 186 may receive data from the domain speechlets 188, for example, and may generate audio data to be utilized by the speakers 122 of the voice-enabled device 102 to output corresponding audio. The audio may include a response to the user utterance, such as a response confirming that the remote system 110 and/or the voice-enabled device 102 has performed an action based at least in part on the user utterance. The TTS component 186 is also described in more detail with respect to FIG. 10, below. In examples, the speech processing system 180 may interface with the other components of the remote system 110 as described herein to surface device-grouping recommendations to users of voice-enabled devices 102, 104.

The user registry component 150 may be configured to identify, determine, and/or generate associations between users, user profiles, user accounts, and/or devices. For example, one or more associations between user profiles and user accounts may be identified, determined, and/or generated by the user registry 150. The user registry 150 may additionally store information indicating one or more applications and/or resources accessible to and/or enabled for a given user profile and/or user account. Additionally, the user registry 150 may include information indicating device identifiers, such as naming identifiers, associated with a given user profile and/or user account, as well as device types associated with the device identifiers. The user registry 150 may also include information indicating user profile identifiers, user account identifiers, naming identifiers of devices associated with user profiles and/or user accounts, and/or associations between voice-enabled devices 102, 104 and accessory devices 106(*a*)-(*c*). It should also be understood that a user account may be associated with one or more than one user profiles. It should also be understood that the terms "user account" and/or "user profile" may be used to describe a set of data and/or functionalities associated with a given account identifier and/or profile identifier. For example, data identified, determined, and/or generated while using some or all of the system 100 may be stored or otherwise associated with an account identifier and/or profile identifier. Data associated with the user accounts and/or profiles may include, for example, account/profile access information, historical usage data, device-association data, and/or preference data.

The data stores 152 may be configured to identify, determine, and/or generate data associated with use of the voice-enabled devices 102, 104 and/or the accessory devices 106(*a*)-(*c*). For example, the voice-enabled devices 102, 104 may be utilized to cause the accessory devices 106(*a*)-(*c*) to operate. Usage data may be identified, determined, and/or generated that indicates some or each of these interactions. Timing data may also be identified, determined, and/or generated that indicates a time at which some or each of these interactions took place. It should be understood that while the user registry 150 and the data stores 152 are illustrated as separate components, the user registry 150 and the data stores 152 may be the same component.

The modelling component 154 may be configured to utilize data stored in the user registry 150 and/or the data stores 152 to determine and/or predict useful information to be utilized by the system 110. For example, the modelling component 154 may include one or more models, such as one or more linguistics models 156, one or more device-activation models 158, and/or one or more device-affinity models 160. The models described herein may be rules-based in some examples and/or may be generated based at least in part on machine learning techniques in other examples. It should be noted that while multiple models are described herein, the processes described with respect to these models may be associated with a single model configured to perform such processes.

As to the linguistics models 156, machine learning techniques may be utilized to generate models that extract and/or utilize extracted naming indicators associated with the accessory devices 106(*a*)-(*c*) and calculate semantic similarities between naming indictors for devices associated with a given user profile and/or user account. For example, the linguistics models 156 may be configured and/or trained to recognize similar naming indicators associated with accessory devices 106(*a*)-(*c*), which may indicate that such accessory devices 106(*a*)-(*c*) are typically used together. By way of example, a naming indicator of "living room lamp A" and "living room lamp B" have a high degree of semantic similarity. A probability score indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models 156 may also be configured and/or trained to recognize semantic differences in device naming indicators to identify similarities. For example, a device with a naming indicator of "couch lamp" and another device with a naming indicator of "sofa lamp" may be analyzed by the linguistics models 156 to determine that "couch" and "sofa" are frequently used interchangeably, universally and/or with respect to a given user profile and/or user account.

A threshold probability score may be identified, determined, and/or generated, and results from the linguistics models 156 may be analyzed with respect to the threshold probability to determine whether, for a given device pair, a grouping recommendation should be presented to the user and/or a device group should be created. In examples, the threshold probability score may be initially set based at least in part on historical data indicating how semantically similar device names may be associate those device names with the same or a similar meaning. Thereafter, feedback received on the outcomes of the linguistics models 156 may be utilized to adjust and/or set new threshold probability scores. For example, if the initial threshold produced few recommendations, it may be determined that the threshold was set at a score higher than desired. If the initial threshold produced more recommendations than desired and/or the recommendations are not accepted by users, it may be determined that the threshold was set at a score lower than desired. By way of example, a threshold probability score may be set at 0.9. In the example of FIG. 1, the first accessory device 106(*a*) may be associated with a naming indicator of "office overhead light" while the second accessory device 106(*b*) may be associated with a naming indicator of "office lamp." Additionally, the third accessory device 106(*c*) may be associated with a naming indicator of "bedroom light." These naming indicators may have been provided by the user via user input to the voice-enabled devices 102, 104 and/or the personal device 108, such as during setup of the accessory devices 106(*a*)-(*c*) and/or at some point after setup. Data indicating these naming indicators may be stored in the user registry 150 and/or the data stores 152. The modelling component 154, particularly the linguistics models 156, may receive the data from the user registry 150 and/or the data stores 152.

A device pair may be identified, determined, and/or generated for each pair of the accessory devices 106(*a*)-(*c*). For example, a first device pair may correspond to the first accessory device 106(*a*) and the second accessory device 106(*b*); a second device pair may correspond to the first accessory device 106(*a*) and the third accessory device 106(*c*); and a third device pair may correspond to the second accessory device 106(*b*) and the third accessory device 106(*c*). The naming indicators associated with the accessory devices 106(*a*)-(*c*) may be analyzed, using the linguistics models 156, to determine a probability score for each device pair. In the example used herein, a high probability score may be determined for the first device pair given the semantic similarity between "office overhead light" and "office lamp." For example, the linguistics models 156 may determine that both naming indicators utilize the word "office" and, while the remaining words are not the same "overhead light" has a degree of semantic similarity with "lamp." For the second device pair, a lower probability score may be determined. For example, while "office overhead light" and "bedroom light" share the word "light," the linguistics models 156 may be configured to identify "office" and "bedroom" as having semantic differences and/or contextual differences, which may result in a lower probability score than that determined for the first device group. In this way, the linguistics models 156 may be configured to weight different words in a naming indicator based at least in part on a given word's location with respect to the whole of the naming indicator and/or based at least in part on syntax of the naming indicator. For the third device pair, a similar probability score may be determined to that of the second device pair. Based at least in part on the analysis described above, it may be determined that the probability score for the first device pair exceeds the threshold probability score, which may result in a determination that a grouping recommendation should be generated and/or sent.

As to the device-activation models 158, rules-based and/or machine learning techniques may be utilized to generate models that extract and/or utilize timing information associated with when an accessory device 106(a)-(c) is turned on and/or turned off. For example, devices that are operated at or near the same time such that they have a similar usage pattern may be candidates for inclusion in a device group. The device-activation models 158 may be configured to receive timing data from the user registry 150 and/or the data stores 152. The timing data may be utilized to determine when accessory devices 106(a)-(c) are turned on and/or turned off. It should be noted that activation of accessory devices 106(a)-(c) may be tracked for operations using the voice-enabled device 102, the personal device 108, and/or through tactile input to the accessory devices 106(a)-(c) themselves. As with the linguistics models 156, a device pair may be generated for some or each pair of accessory devices 106(a)-(c) associated with a voice-enabled device 102, 104 and/or a user profile and/or user account. A distance matrix may be generated, such as through dynamic time warping distances and/or Euclidean distances. Closer distances may indicate more similar usage patterns between accessory devices 106(a)-(c). A threshold degree of usage similarity may be identified and/or determined and may be utilized to analyze whether a given device pair has a usage similarity that meets or exceeds the threshold degree of usage similarity. In examples, clustering methods may be utilized to identify degrees of usage similarity, which a usage similarity analyzed with respect to how close a value corresponding to the usage similarity is to a centroid of a cluster and/or multiple clusters. In examples where Euclidean distances are utilized, a threshold distance may be set and distances associated with the device pairs may be analyzed with respect to the threshold distance. Distances that are, for example, less than or equal to the threshold distance may indicate that the devices associated with the device pair are candidates for inclusion in a device group.

As to the device-affinity models 160, rules-based and/or machine learning techniques may be utilized to generate models that extract and/or utilize device affinity information associated with a frequency at which an accessory device 106(a)-(c) is caused to operate by given voice-enabled devices 102, 104. For example, the environment may include two or more voice-enabled devices 102 and 104, say one in an office and one in a kitchen. The office voice-enabled device 102 may be frequently utilized to operate certain accessory devices, such as, for example, the first accessory device 106(a) and the second accessory device 106(b). The bedroom voice-enabled device 104 may be frequently utilized to operate other accessory devices, such as, for example, the third accessory device 106(c) and another accessory device such as a door lock, a security system, etc. The device-affinity models 160 may determine a frequency at which such voice-enabled devices 102 and 104 are utilized to operate the accessory devices 106(a)-(c). In examples where at least two of the accessory devices 106(a)-(b) are operated from a given voice-enabled device 102, those accessory devices 106(a)-(b) may be candidates for addition to a preexisting device group and/or for generation of a new device group. By way of example, device-affinity data may be stored in the user registry 150 and/or the data stores 152 and may be received by the device-affinity models 160 for identifying which accessory devices 106(a)-(c) are operated by which voice-enabled devices 102, 104 and frequencies associated with such operations.

By way of example, a control rate may be identified for each pair of voice-enabled device and accessory device. In the example used in FIG. 1, a control rate may be determined for the interactions between some or each accessory device 106(a)-(c) and some or each voice-enabled device 102, 104. For example, a control rate of 0.9 may be determined for the interaction of the first accessory device 106(a) with the first voice-enabled device 102. A control rate of 0.1 may be determined for the interaction of the first accessory device 106(a) with the second voice-enabled device 104. Likewise, a control rate of 0.8 may be determined for the interaction of the second accessory device 106(b) with the first voice-enabled device 102, while a control rate of 0.2 may be determined for the interaction of the second accessory device 106(b) with the second voice-enabled device 104. In this example, the device-affinity models 160 may determine that the first accessory device 106(a) and the second accessory device 106(b) are frequently controlled by the first voice-enabled device 102, making those accessory devices 106(a)-(b) candidates for inclusion in a device group. In examples, a threshold control rate may be established and may be utilized to determine if an accessory device 106(a)-(c) is controlled by a particular voice-enabled device 102, 104 with enough frequency to make the accessory device 106(a)-(c) a candidate for inclusion in the device group.

The grouping-recommendation component 162 may be configured to generate recommendation data representing a recommendation to associate accessory devices 106(a)-(c) with each other as a device group. For example, the modelling component 154 may determine, using one or more of the models described herein, that a recommendation should be presented to associate accessory devices 106(a)-(c) with each other as the device group. The modelling component 154 may call and/or otherwise cause the grouping-recommendation component 162 to generate the recommendation data based at least in part on determining that a recommendation should be presented. The modelling component 154 and/or the grouping-recommendation component 162 may identify the accessory devices 106(a)-(c) to be associated with each other and may identify naming indicators associated with those accessory devices 106(a)-(c). The recommendation data may be generated and may represent a recommendation to associate the accessory devices 106(a)-(c) and/or an indication of which devices are to be associated with each other. The recommendation data may correspond to and/or include audio data representing audio to be output by one or more devices, such as the voice-enabled device 102. For example, the recommendation data and/or directive data may be sent to the voice-enabled device 102, which may output the audio, via the speakers 122. An example of output audio may be "would you like to group Light 1 and Light 2?" The recommendation data may correspond to and/or include text data representing text to be presented by one or more devices, such as the personal device 108 and/or the voice-enabled device 102. For example, the recommendation data and/or directive data may be sent to the personal device 108 and/or the voice-enabled device 102, which may present the text, such as via the displays 124.

The naming-recommendation component 164 may be configured to generate recommendation data representing a naming recommendation for a device group. For example, when recommending the creation of a new device group, it may be advantageous to recommend a naming indicator for the device group. In other examples, when a preexisting group has been established, it may be advantageous to recommend a different naming indicator than the current naming indicator. The modelling component 154 and/or the naming-recommendation component 164 may identify words associated with accessory device naming indicators and may identify common and/or similar words as between the naming indicators. The common words may be utilized to generate recommendation data representing a recommendation for a naming indicator for a device group. For example, if a voice-enabled device 102 is associated with accessory devices 106(a)-(b) having naming indicators of "Office Lamp 1" and "Office Light," the system 110 may identify "office" as a common word as between the naming indicators and may generate recommendation data representing a recommendation to name a device group associated with these accessory devices as "Office Lights."

In examples, naming-recommendation component 164 may analyze the common words to determine a naming indicator for the device group. For example, the analysis may include determining an ensemble score using linguistic similarity between naming indicators of accessory devices 106(a)-(c) in a device group and/or the naming indicators of accessory devices 106(a)-(c) that are associated with commonly used device groups. A single-value score from this analysis may represent the value of a common group name as the recommended group name. The most-favored score may be utilized to provide a naming recommendation to a user of a voice-enabled device 102. Additionally, or alternatively, the remote system 110 may determine the distance of some or all accessory device names in a recommended group to common group names. This process may include determining an aggregate of a many-to-one analysis with the group name that is closest in the aggregate may be identified as the group-name recommendation. A majority-voting process may additionally, or alternatively, be utilized to select group-name recommendations.

Additionally, or alternatively, the remote system 110 may determine usage-pattern associations, for example using dynamic time warping techniques. In these examples, distances may be aggregated and a group-name recommendation may be generated based at least in part on which set of general and/or generally-used accessory devices is most like the group of recommended accessory devices 106(a)-(c) with respect to usage patterns. In other examples, the remote system 110 may analyze usage patterns of recommended devices with respect to usage patterns of common groups, such as how and/or when groups are used instead of individual device usage. Additionally, or alternatively, in examples where some or all of the processes described herein do not produce a group-naming recommendation and/or produce a group-naming recommendation below a threshold confidence level, a group name may be identified by analyzing a location of the device with respect to an environment and/or a device type.

The content-injection speechlet 166 may be configured to interface between the modelling component 154 and other components of the remote system 110, such as the ASR component 182 and/or the NLU component 184. For example, when recommendation data is generated as described herein, the content-injection speechlet 166 may be utilized to generate directive data to be sent to the voice-enabled device 102 for output of the recommendation to the user. Additionally, the user's response may be captured by the voice-enabled device 102 and the content-injection component 166 may be configured to utilize the response to perform actions, such as creating the device group and/or associating a device group with a naming indicator, for example. For example, the recommendation of "would you like to create a group for Light 1 and Light 2?" may be output by the speakers 122 of the voice-enabled device 102. The user may provide a user utterance of "yes," which may be captured by the microphones 120 of the voice-enabled device 102 and corresponding audio data may be generated and sent to the remote system 110. The audio data may be analyzed and intent data indicating an intent to create the device group may be generated and sent to the content-injection speechlet 166.

The notification component 168 may be configured to generate a notification corresponding to the recommendation data. For example, the notification component 168 may be configured to generate notification data representing a notification to be presented on a display of the personal device 108 and/or the displays 124 of the voice-enabled device 102. The notification may be associated with the recommendation and/or may include the recommendation as described herein. The notification data may be sent to the voice-enabled device 102 for presentation, such as to the user.

The grouping-component 170 may be configured to receive instructions and/or information from the content-injection speechlet 166 and may utilize such information to associate the accessory devices 106(a)-(c) with a device group. Data indicating the association between accessory devices 106(a)-(c) as a device group may be stored, for example, in association with the user registry 150 and/or the data stores 152. Thereafter, a user may provide a user utterance to the voice-enabled device 102 to perform an action with respect to the device group. The data indicating the association between accessory devices 106(a)-(c) may be utilized by one or more speechlets of the remote system 110 to operate the accessory devices 106(a)-(c) as a group.

The speechlet(s) described herein may include a speech-enabled web component that may run in the remote system 110. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 114, 128, 136, and/or 144, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 114, 128, 136, and/or 144 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 114, 128, 136, and/or 144 may possess its own local memory, which also may store program components, program data, and/or one or more operating systems.

The memory 118, 132, 140, and/or 148 may include volatile and nonvolatile memory, removable and non-removable media implemented in any method or technology for storage of information, such as computer-readable instructions, data structures, program component, or other data. Such memory 118, 132, 140, and/or 148 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 118, 132, 140, and/or 148 may be implemented as computer-readable storage media ("CRSM"), which may be any available physical media accessible by the processor(s) 110 and/or 124 to execute instructions stored on the memory 118, 132, 140, and/or 148. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 118, 132, 140, and/or 148, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 116, 130, 138, and/or 146 may enable messages between the components and/or devices shown in system 100 and/or with one or more other remote systems, as well as other networked devices. Such network interface(s) 116, 130, 138, and/or 146 may include one or more network interface controllers (NICs) or other types of transceiver devices to send and receive messages over the network 110.

For instance, each of the network interface(s) 116, 130, 138, and/or 146 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 116, 130, 138, and/or 146 may include a wide area network (WAN) component to enable message over a wide area network.

In some instances, the remote system 110 may be local to an environment associated the first voice-enabled device 102 and/or the second voice-enabled device 104. For instance, the remote system 110 may be located within the first voice-enabled device 102 and/or the second voice-enabled device 104. In some instances, some or all of the functionality of the remote system 110 may be performed by the first voice-enabled device 102 and/or the second voice-enabled device 104. Also, while various components of the remote system 110 have been labeled and named in this disclosure and each component has been described as being configured to cause the processor(s) 144 to perform certain operations, it should be understood that the described operations may be performed by some or all of the components and/or other components not specifically illustrated.

Figure 2:
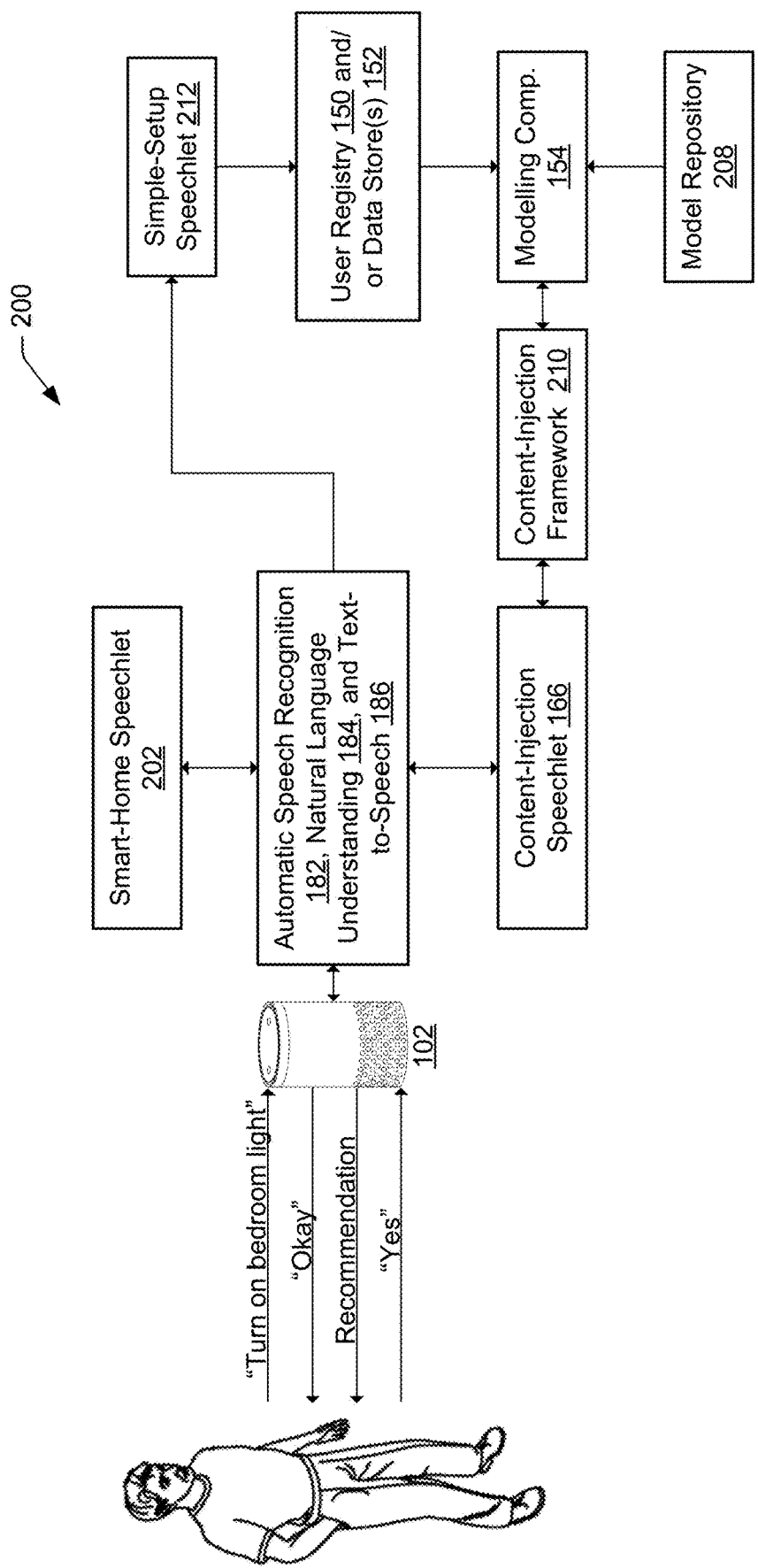
FIG. 2 illustrates a conceptual diagram of example components of devices and systems for intelligent device grouping from a user utterance.

FIG. 2 illustrates a conceptual diagram of example components of devices and systems for intelligent device grouping from a user utterance. The system 200 illustrated with respect to FIG. 2 shows conceptual components of the remote system 110 along with a voice-enabled device 102 and a user interacting therewith. FIG. 2 describes the functionality of the remote system 110 in the context of an example user utterance provided by the user.

For example, the user may provide a user utterance such as "turn on bedroom light." The microphones of the voice-enabled device 102 may capture audio corresponding to the user utterance and may generate audio data. The audio data may be sent from the voice-enabled device 102 to the remote system 110. For example, an ASR component 182 of the remote system 110 may generate text data corresponding to the audio data. An NLU component 184 of the remote system 110 may generate, based at least in part on the audio data, intent data representing an intent to perform an action. A text-to-speech (TTS) component 186 may generate audio data from text data for output via speakers of the voice-enabled device 102. The ASR component 182, NLU component 184, and TTS component 186 are described in more detail below with respect to FIG. 10. In the example provided with respect to FIG. 2, the intent may be, for example, to "turn on" or otherwise activate an accessory device with a naming indicator of "bedroom light." Based at least in part on the intent data, a speechlet configured to handle the intent may be utilized. For example, a smart-home speechlet 202 may receive the intent data and may utilize that intent data to generate directive data representing a directive for the voice-enabled device 102 to operate the accessory device with the naming indicator of "bedroom light." The directive data may be sent to the voice-enabled device 102, which may further communicate with the "bedroom light" accessory device to cause that accessory device to turn on.

Additionally, in examples, a text-to-speech (TTS) component of the remote system 110 may be utilized to generate audio data corresponding to a response to the user utterance. In the example of FIG. 2, the remote system 110 may successfully identify the intent of the user utterance and may successfully cause the "bedroom light" to "turn on." In these examples, the TTS component may be utilized to generate and/or identify confirmatory audio data. The audio data may be sent to the voice-enabled device 102 for output by speakers of the voice-enabled device 102. Here, the audio data may correspond to audio of "okay," indicating that the user utterance was processed successfully.

Additionally, the remote system 110 may provide a grouping recommendation to the user as described herein. For example, a grouping recommendation may be provided based at least in part on the user providing the user utterance and/or the audio data corresponding to the user utterance being received by the remote system 110. As described more fully above, a modelling component 154 may be configured to utilize data stored in the user registry 150 and/or the data stores 152 to determine and/or predict useful information to be utilized by the remote system 110. For example, the modelling component 154 may include one or more models, such as one or more linguistics models, one or more device-activation models, and/or one or more device-affinity models. The models may be stored in a model repository 208.

As to the linguistics models, machine learning techniques may be utilized to generate models that extract and/or utilize extracted naming indicators associated with the accessory devices and determine semantic similarity between naming indictors for devices associated with a given user profile and/or user account. For example, the linguistics models may be configured and/or trained to recognize similar naming indicators associated with accessory devices, which may indicate that such accessory devices are typically used together. A probability score indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models may also be configured and/or trained to recognize semantic differences in device naming indicators to identify similarities.

A threshold probability score may be identified, determined, and/or generated, and results from the linguistics models may be analyzed with respect to the threshold probability to determine whether, for a given device pair, a grouping recommendation should be presented to the user and/or a device group should be created. Data indicating naming indicators may be stored in the user registry 150 and/or the data stores 152. The modelling component, particularly the linguistics models, may receive the data from the user registry 150 and/or the data stores 152.

As to the device-activation models, rules-based and/or machine learning techniques may be utilized to generate models that extract and/or utilize timing information associated with when an accessory device is turned on and/or turned off. For example, devices that are operated at or near the same time such that they have a similar usage pattern may be candidates for inclusion in a device group. The device-activation models may be configured to receive timing data from the user registry 150 and/or the data stores 152. The timing data may be utilized to determine when accessory devices are turned on and/or turned off. As with the linguistics models, a device pair may be generated for some or each pair of accessory devices associated with a voice-enabled device 102 and/or a user profile and/or user account. A distance matrix may be generated, such as through dynamic time warping distances and/or Euclidean distances. Closer distances may indicate more similar usage patterns between accessory devices. A threshold degree of usage similarity may be identified and/or determined and may be utilized to analyze whether a given device pair has a usage similarity that meets or exceeds the threshold degree of usage similarity. In examples where Euclidean distances are utilized, a threshold distance may be set and distances associated with the device pairs may be analyzed with respect to the threshold distance. Distances that are, for example, less than or equal to the threshold distance may indicate that the devices associated with the device pair are candidates for inclusion in a device group.

As to the device-affinity models, rules-based and/or machine learning techniques may be utilized to generate models that extract and/or utilize device affinity information associated with a frequency at which an accessory device is caused to operate by given voice-enabled devices. For example, the environment may include two or more voice-enabled devices, say one in an office and one in a kitchen. The office voice-enabled device may be frequently utilized to operate certain accessory devices, such as, for example, a first accessory device and a second accessory device. The bedroom voice-enabled device may be frequently utilized to operate other accessory devices, such as, for example, a third accessory device and another accessory device such as a door lock, a security system, etc. The device-affinity models may determine a frequency at which such voice-enabled devices are utilized to operate the accessory devices. In examples where at least two of the accessory devices are operated from a given voice-enabled device, those accessory devices may be candidates for addition to a preexisting device group and/or for generation of a new device group. By way of example, device-affinity data may be stored in the user registry 150 and/or the data stores 152 and may be received by the device-affinity models for identifying which accessory devices are operated by which voice-enabled devices and frequencies associated with such operations.

By way of example, a control rate may be identified for each pair of voice-enabled device and accessory device. The device-affinity models may determine that the first accessory device and the second accessory device are frequently controlled by the first voice-enabled device, making those accessory devices candidates for inclusion in a device group. In examples, a threshold control rate may be established and may be utilized to determine if an accessory device is controlled by a particular voice-enabled device with enough frequency to make the accessory device a candidate for inclusion in the device group.

The content-injection speechlet 166 may be configured to interface between the modelling component 154 and other components of the remote system 110, such as the ASR component 182 and/or the NLU component 184. For example, when recommendation data is generated as described herein, the content-injection speechlet 166 may be utilized to generate directive data to be sent to the voice-enabled device 102 for output of the recommendation to the user. Additionally, the user's response may be captured by the voice-enabled device 102 and the content-injection component 166 may be configured to utilize the response to perform actions, such as creating the device group and/or associating a device group with a naming indicator, for example. As shown in FIG. 2, the content-injection speechlet 166 may be utilized to inject the recommendation data into the flow of interactions with the user. For example, in addition to outputting audio indicating that the user utterance was successfully processed, here illustrated as "okay," the content-injection speechlet 166 may cause audio data corresponding to the recommendation to be sent to the voice-enabled device 102 for output.

For example, the recommendation of "would you like to create a group for Light 1 and Light 2?" may be output by the speakers of the voice-enabled device 102. The user may then provide a user utterance of "yes," which may be captured by the microphones of the voice-enabled device 102 and corresponding audio data may be generated and sent to the remote system 110. The audio data may be analyzed and intent data indicating an intent to create the device group. Thereafter, a simple-setup speechlet 212 may be called to generate the association between accessory devices in a device group. Data indicating the device group and/or the association of accessory devices with the device group may be stored, for example, the user registry 150.

The content injection framework 210 may be a framework that may allow developers to enhance user interaction by injecting content and/or directive data into available opportunity slots associated with intent data. The slots may be time periods when the customer is open to new interactions. As illustrated in FIG. 2, the time period is after a user provides a user utterance to the voice-enabled device 102 and while that user utterance is being processed. Other example time periods may be different times of the day, days of the week, after and/or before a user may take a particular action such as interacting with a companion application on a personal device associated with the user, etc.

Figure 3:
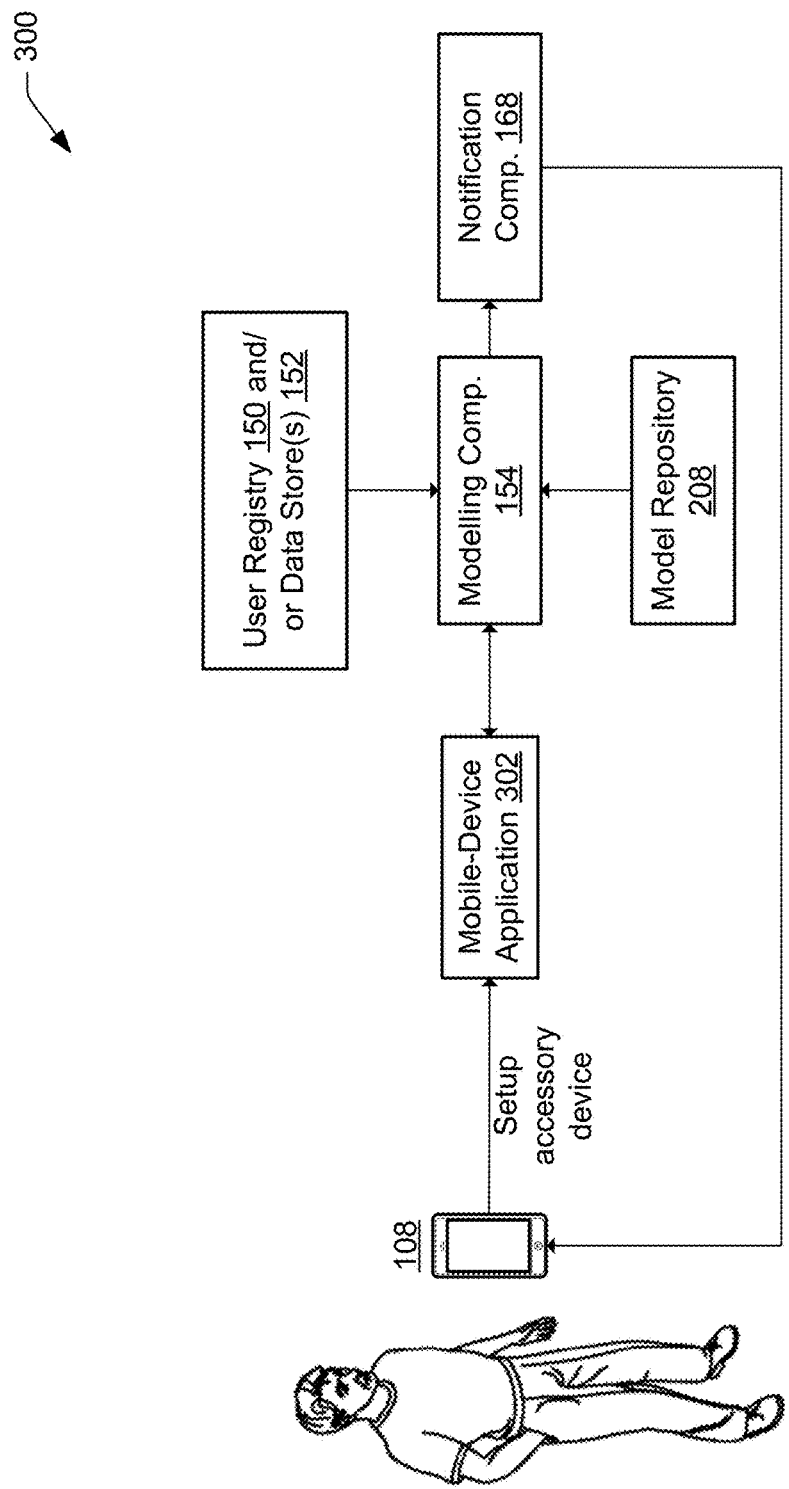
FIG. 3 illustrates a conceptual diagram of example components of devices and systems for event-based intelligent device grouping.

FIG. 3 illustrates a conceptual diagram of example components of devices and systems for event-based intelligent device grouping. The system 300 illustrated with respect to FIG. 3 shows conceptual components of the remote system 110 along with a personal device 108 and a user interacting therewith. FIG. 3 describes the functionality of the remote system 110 in the context of an example user utterance provided by the user.

For example, a user may set up or otherwise configure an accessory device with a voice-enabled device 102 and/or one or more other accessory devices. Additionally, or alternatively, the user may alter information associated with an accessory device. In examples, this setup process may be performed via a mobile-device application 302 stored on and/or accessible to the personal device 108. During the setup process, the user may provide a naming indicator for the accessory device, which may be stored in association with the user registry 150 and/or the data stores 152.

As described more fully herein, the remote system 110 may utilize one or more models to recommend device groupings. For example, a grouping recommendation may be provided based at least in part on the user providing the setup information and/or based at least in part on interactions between the voice-enabled device and the accessory device. As described more fully above, a modelling component 154 may be configured to utilize data stored in the user registry 150 and/or the data stores 152 to determine and/or predict useful information to be utilized by the remote system 110. For example, the modelling component 154 may include one or more models, such as one or more linguistics models, one or more device-activation models, and/or one or more device-affinity models. The models may be stored in a model repository 208.

As to the linguistics models, machine learning techniques may be utilized to generate models that extract and/or utilize extracted naming indicators associated with the accessory devices and determine semantic similarity between naming indictors for devices associated with a given user profile and/or user account. For example, the linguistics models may be configured and/or trained to recognize similar naming indicators associated with accessory devices, which may indicate that such accessory devices are typically used together. A probability score indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models may also be configured and/or trained to recognize semantic differences in device naming indicators to identify similarities.

A threshold probability score may be identified, determined, and/or generated, and results from the linguistics models may be analyzed with respect to the threshold probability to determine whether, for a given device pair, a grouping recommendation should be presented to the user and/or a device group should be created. Data indicating naming indicators may be stored in the user registry 150 and/or the data stores 152. The modelling component, particularly the linguistics models, may receive the data from the user registry 150 and/or the data stores 152.

As to the device-activation models, rules-based and/or machine learning techniques may be utilized to generate models that extract and/or utilize timing information associated with when an accessory device is turned on and/or turned off. For example, devices that are operated at or near the same time such that they have a similar usage pattern may be candidates for inclusion in a device group. The device-activation models may be configured to receive timing data from the user registry 150 and/or the data stores 152. The timing data may be utilized to determine when accessory devices are turned on and/or turned off. As with the linguistics models, a device pair may be generated for some or each pair of accessory devices associated with a voice-enabled device and/or a user profile and/or user account. A distance matrix may be generated, such as through dynamic time warping distances and/or Euclidean distances. Closer distances may indicate more similar usage patterns between accessory devices. A threshold degree of usage similarity may be identified and/or determined and may be utilized to analyze whether a given device pair has a usage similarity that meets or exceeds the threshold degree of usage similarity. In examples where Euclidean distances are utilized, a threshold distance may be set and distances associated with the device pairs may be analyzed with respect to the threshold distance. Distances that are, for example, less than or equal to the threshold distance may indicate that the devices associated with the device pair are candidates for inclusion in a device group.

As to the device-affinity models, rules-based and/or machine learning techniques may be utilized to generate models that extract and/or utilize device affinity information associated with a frequency at which an accessory device is caused to operate by given voice-enabled devices. For example, the environment may include two or more voice-enabled devices, say one in an office and one in a kitchen. The office voice-enabled device may be frequently utilized to operate certain accessory devices, such as, for example, a first accessory device and a second accessory device. The bedroom voice-enabled device may be frequently utilized to operate other accessory devices, such as, for example, a third accessory device and another accessory device such as a door lock, a security system, etc. The device-affinity models may determine a frequency at which such voice-enabled devices are utilized to operate the accessory devices. In examples where at least two of the accessory devices are operated from a given voice-enabled device, those accessory devices may be candidates for addition to a preexisting device group and/or for generation of a new device group. By way of example, device-affinity data may be stored in the user registry 150 and/or the data stores 152 and may be received by the device-affinity models for identifying which accessory devices are operated by which voice-enabled devices and frequencies associated with such operations.

By way of example, a control rate may be identified for each pair of voice-enabled device and accessory device. The device-affinity models may determine that the first accessory device and the second accessory device are frequently controlled by the first voice-enabled device, making those accessory devices candidates for inclusion in a device group. In examples, a threshold control rate may be established and may be utilized to determine if an accessory device is controlled by a particular voice-enabled device with enough frequency to make the accessory device a candidate for inclusion in the device group.

The mobile-device application 302 may be configured to interface between the modelling component 154 and other components of the personal device 108. For example, when recommendation data is generated as described herein, the mobile-device application 302 and/or a notification component 168 may be utilized to generate recommendation data to be sent to the personal device 108 for presentation of the recommendation to the user. Additionally, the user's response may be captured by the personal device 108 and the mobile-device application 302 may be configured to utilize the response to perform actions, such as creating the device group and/or associating a device group with a naming indicator, for example.

For example, the recommendation of "would you like to create a group for Light 1 and Light 2?" may be presented via a display of the personal device 108. The user may then provide an input indicating an intent to confirm that the device group should be created. The input data corresponding to the input may be analyzed to create the device group. As illustrated in FIG. 3, the time period is during setup of the accessory device. Other example time periods may be different times of the day, days of the week, after and/or before a user may take a particular action such as interacting with a companion application on a personal device associated with the user, etc.

The notification component 168 may be configured to generate a notification corresponding to the recommendation data. For example, the notification component 168 may be configured to generate notification data representing a notification to be presented on a display of the personal device 108. The notification may be associated with the recommendation and/or may include the recommendation as described herein. The notification data may be sent to the personal device 108 for presentation, such as to the user.

Figure 4:
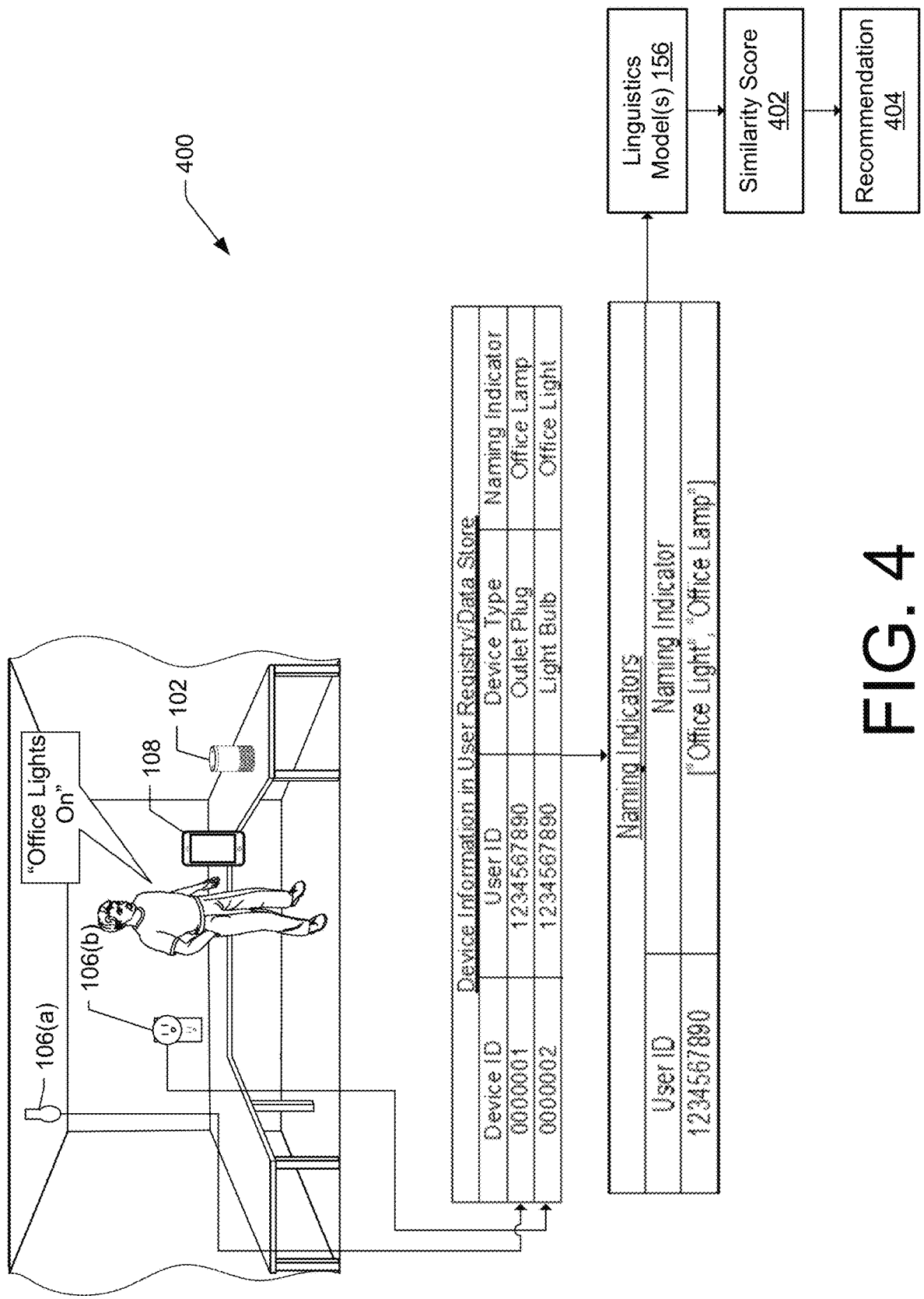
FIG. 4 illustrates a conceptual diagram of example components of devices and systems for intelligent device grouping using linguistics model(s).

FIG. 4 illustrates a conceptual diagram of example components of devices and systems for intelligent device grouping using linguistics model(s). The system 400 illustrated with respect to FIG. 4 shows an example environment with a user situated therein. The environment includes a voice-enabled device 102, accessory devices 106(a)-(b), and a personal device 108. FIG. 4 illustrates a process whereby the linguistics model(s) are utilized to generate a recommendation for device grouping.

For example, during accessory device setup and/or when information associated with the accessory device is updated and/or changed, that information may be stored in association with the remote system 110, such as in the user registry 150 and/or the data stores 152. As illustrated in FIG. 4, the information may include, for example, a device identifier, a user profile and/or user account identifier, a device type indicator, and/or a naming indicator associated with each accessory device. As shown in FIG. 4, for the first accessory device 106(a), it may be associated with the device identifier of "0000001," a user profile and/or user account identifier of "1234567890," a device type of "outlet plug," and a naming indicator of "Office Lamp." Likewise, the second accessory device 106(b) may be associated with the device identifier of "0000002" the user profile and/or user account identifier of "1234567890," the device type of "light bulb," and the naming indicator of "Office Light."

It should be understood that the example identifiers, device types, and indicators are provided by way of illustration only, and not by way of limitation. In this example, the device identifiers and/or the device types may be identified, determined, and/or generated by the remote system 110 and/or by the accessory devices 106(a)-(b). For example, some accessory devices may be pre-associated with identifiers and/or other information prior to setup of those devices. Additionally, or alternatively, the accessory devices may be assigned identifiers and/or other information by the remote system 110. As shown in FIG. 4, both the first accessory device 106(a) and the second accessory device 106(b) have the same user profile and/or user account identifier, which may indicate that both accessory devices 106(a)-(b) are associated with the same user profile and/or user account and/or are associated with the same voice-enabled device.

For a particular user profile and/or user account, the remote system 110 may identify and/or determine naming indicators associated with accessory devices based at least in part on the information described above as stored in association with the user registry 150 and/or the data stores 152. For example, the remote system 110 may determine that for user profile and/or user account identifier "1234567890," accessory devices have the naming indicators of "Office Light" and "Office Lamp." These naming indicators may be utilized by the linguistics model(s) 156 as described herein. For example, the linguistics model(s) 156 may determine semantic similarities between the naming indicators of the accessory devices and may utilize that information to recommend device grouping. A similarity score 402 indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models 156 may also be configured and/or trained to recognize semantic differences in device naming indicators to identify similarities. For example, a device with a naming indicator of "office lamp" and another device with a naming indicator of "study lamp" may be analyzed by the linguistics models 156 to determine that "office" and "study" are frequently used interchangeably, universally and/or with respect to a given user profile and/or user account.

A threshold similarity score may be identified, determined, and/or generated, and results from the linguistics models 156 may be analyzed with respect to the similarity score 402 to determine whether, for a given device pair, a grouping recommendation should be presented to the user and/or a device group should be created. A device pair may be identified, determined, and/or generated for each pair of the accessory devices. Based at least in part on the analysis described above, it may be determined that the similarity score 402 for a device pair exceeds the threshold similarity score, which may result in a determination that a grouping recommendation 404 should be generated and/or sent.

Recommendation data may be generated and may represent a recommendation 404 to associate the accessory devices and/or an indication of which devices are to be associated with each other. The recommendation data may correspond to and/or include audio data representing audio to be output by one or more devices, such as the voice-enabled device 102. For example, the recommendation data and/or directive data may be sent to the voice-enabled device 102, which may output the audio. An example of output audio may be "would you like to group Office Light and Office Lamp?" The recommendation data may correspond to and/or include text data representing text to be presented by one or more devices, such as the personal device 108 and/or the voice-enabled device 102. For example, the recommendation data and/or directive data may be sent to the personal device 108 and/or the voice-enabled device 102, which may present the text.

Figure 5:
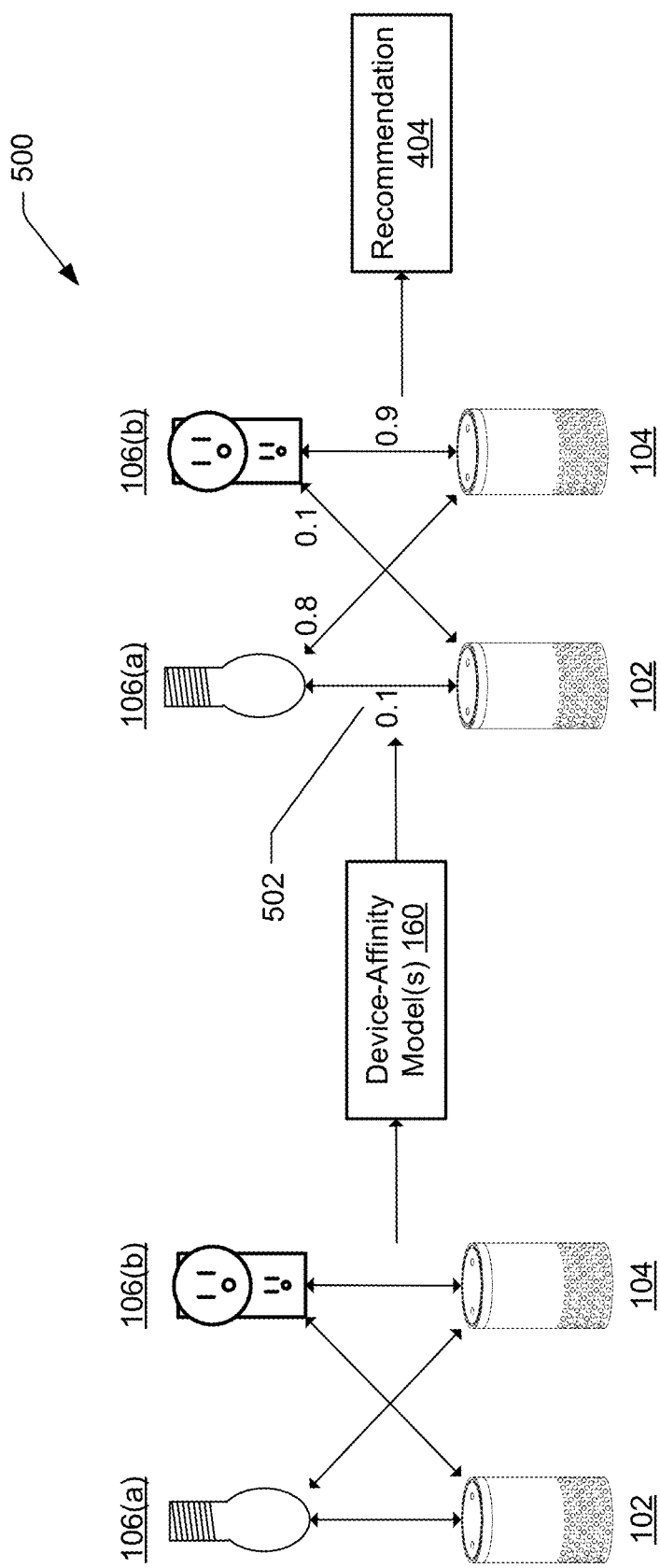
FIG. 5 illustrates a conceptual diagram of example components of devices and system for intelligent device grouping using device-affinity model(s).

FIG. 5 illustrates a conceptual diagram of example components of devices and system 500 for intelligent device grouping using device-affinity model(s). FIG. 5 illustrates a progression from left to right. The system 500 illustrated with respect to FIG. 5 shows an example environment that includes a first voice-enabled device 102, a second voice-enabled device 104, a first accessory device 106(a), and a second accessory device 106(b). FIG. 5 illustrates a process whereby the device-affinity model(s) 160 are utilized to generate a recommendation for device grouping.

For example, rules-based and/or machine learning techniques may be utilized to generate models that extract and/or utilize device affinity information associated with a frequency at which an accessory device is caused to operate by given voice-enabled devices 102, 104. For example, the environment may include two or more voice-enabled devices 102 and 104, say one in an office and one in a kitchen. The office voice-enabled device 102 may be frequently utilized to operate certain accessory devices. The bedroom voice-enabled device 104 may be frequently utilized to operate other accessory devices, such as, for example, the first accessory device 106(a) and the second accessory device 106(b). The device-affinity models 160 may determine a frequency at which such voice-enabled devices 102 and 104 are utilized to operate the accessory devices 106(a)-(b). In examples where at least two of the accessory devices 106(a)-(b) are operated from a given voice-enabled device 104, those accessory devices 106(a)-(b) may be candidates for addition to a preexisting device group and/or for generation of a new device group. By way of example, device-affinity data may be stored in the user registry and/or the data stores and may be received by the device-affinity models 160 for identifying which accessory devices 106(a)-(b) are operated by which voice-enabled devices 102, 104 and frequencies associated with such operations.

By way of example, a control rate 502 may be identified for each pair of voice-enabled device and accessory device. In the example used in FIG. 5, a control rate 502 may be determined for the interactions between some or each accessory device 106(a)-(b) and some or each voice-enabled device 102, 104. For example, a control rate 502 of 0.9 may be determined for the interaction of the second accessory device 106(b) with the second voice-enabled device 104. A control rate 502 of 0.1 may be determined for the interaction of the first accessory device 106(a) with the first voice-enabled device 102. Likewise, a control rate 502 of 0.8 may be determined for the interaction of the first accessory device 106(a) with the second voice-enabled device 104, while a control rate of 0.1 may be determined for the interaction of the second accessory device 106(b) with the first voice-enabled device 102. In this example, the device-affinity models 160 may determine that the first accessory device 106(a) and the second accessory device 106(b) are frequently controlled by the second voice-enabled device 104, making those accessory devices 106(a)-(b) candidates for inclusion in a device group. In examples, a threshold control rate may be established and may be utilized to determine if an accessory device 106(a)-(b) is controlled by a particular voice-enabled device 102, 104 with enough frequency to make the accessory device 106(a)-(b) a candidate for inclusion in the device group.

Recommendation data may be generated and may represent a recommendation 404 to associate the accessory devices and/or an indication of which devices are to be associated with each other. The recommendation data may correspond to and/or include audio data representing audio to be output by one or more devices, such as the voice-enabled device 102, 104. For example, the recommendation data and/or directive data may be sent to the voice-enabled device 102, 104, which may output the audio. An example of output audio may be "would you like to group Office Light and Office Lamp?" The recommendation data may correspond to and/or include text data representing text to be presented by one or more devices, such as the personal device and/or the voice-enabled device 102, 104. For example, the recommendation data and/or directive data may be sent to the personal device and/or the voice-enabled device 102, 104, which may present the text.

FIGS. 6-9 illustrate various processes for intelligent device grouping. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5, 9, and 10, although the processes may be implemented in a wide variety of other environments, architectures and systems.

Figure 6:
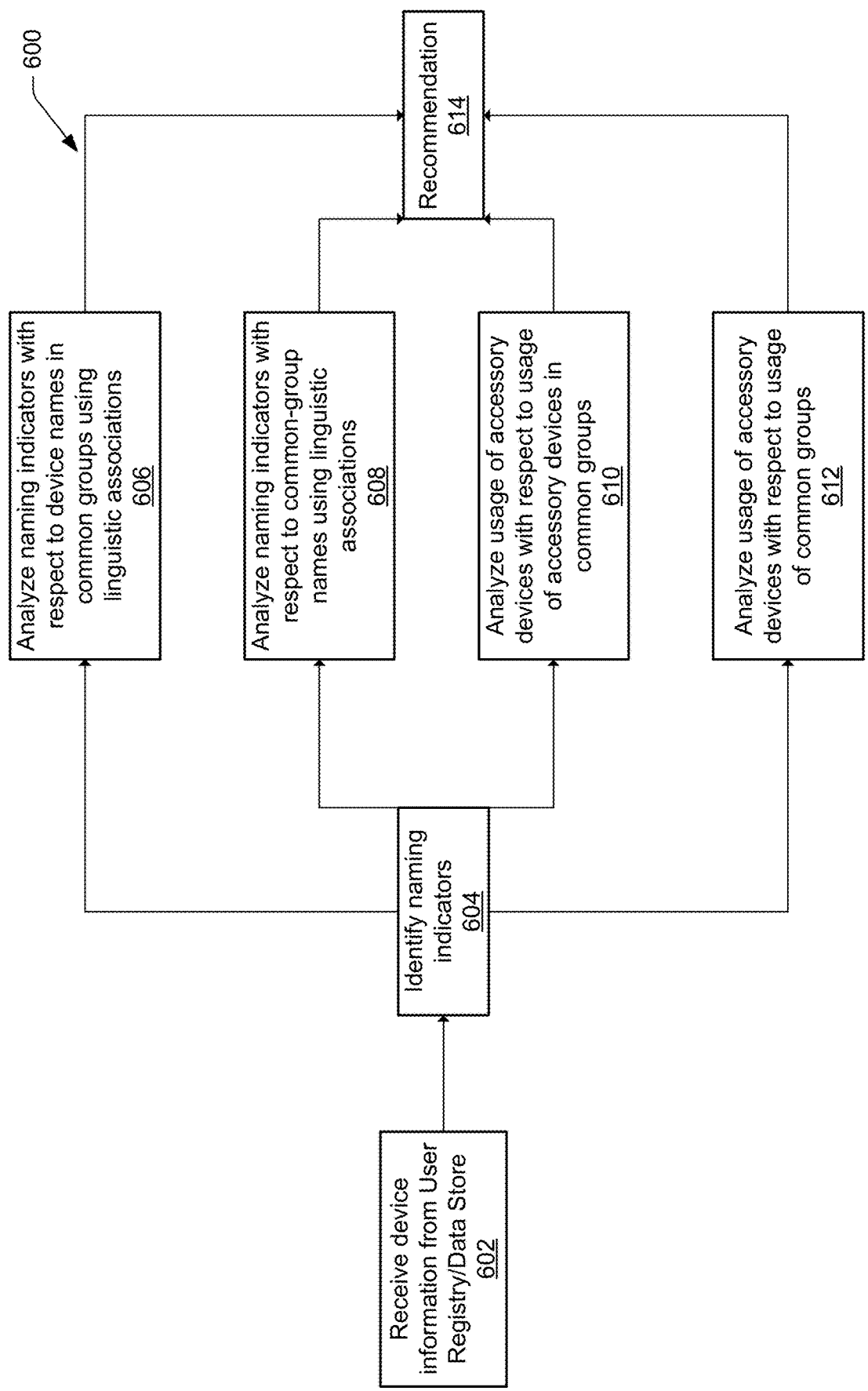
FIG. 6 illustrates a flow diagram of an example process for intelligent group naming recommendations.

FIG. 6 illustrates a flow diagram of an example process 600 for intelligent group naming recommendations. A naming-recommendation component may be configured to generate recommendation data representing a naming recommendation for a device group. For example, when recommending the creation of a new device group, it may be advantageous to recommend a naming indicator for the device group. In other examples, when a preexisting group has been established, it may be advantageous to recommend a different naming indicator than the current naming indicator. At block 602, a modelling component and/or the naming-recommendation component may receive device information associated with the devices indicated to be associated in a device group. At block 604, the system may identify words associated with accessory device naming indicators.

At block 606, the system may analyze the common words to determine a naming indicator for the device group. For example, the analysis may include determining an ensemble score using linguistic similarity between naming indicators of accessory devices in a device group and/or the naming indicators of accessory devices that are associated with commonly used device groups. A single-value score from this analysis may represent the value of a common group name as the recommended group name. The most-favored score may be utilized to provide a naming recommendation to a user of a voice-enabled device. Additionally, or alternatively, at block 608, the remote system may determine the distance of some or all accessory device names in a recommended group to common group names. This process may include determining an aggregate of a many-to-one analysis with the group name that is closest in the aggregate may be identified as the group-name recommendation. A majority-voting process may additionally, or alternatively, be utilized to select group-name recommendations.

Additionally, or alternatively, at block 610, the remote system may determine usage-pattern associations, for example using dynamic time warping techniques. In these examples, distances may be aggregated in a manner similar to that described herein with respect to FIG. 6, and a group-name recommendation may be generated based at least in part on which set of general and/or generally-used accessory devices is most like the group of recommended accessory devices with respect to usage patterns. In other examples, at block 612, the remote system may analyze usage patterns of recommended devices with respect to usage patterns of common groups, such as how and/or when groups are used instead of individual device usage. Additionally, or alternatively, in examples where some or all of the processes described with respect to FIG. 6 do not produce a group-naming recommendation and/or produce a group-naming recommendation below a threshold confidence level, a group name may be identified by analyzing a location of the device with respect to an environment and/or a device type.

At block 614, recommendation data representing a recommendation for a naming indicator for a device group may be generated. For example, if a voice-enabled device is associated with accessory devices having naming indicators of "Office Lamp 1" and "Office Light," the system may identify "office" as a common word as between the naming indicators and may generate recommendation data representing a recommendation to name a device group associated with these accessory devices as "Office Lights."

Figure 7:
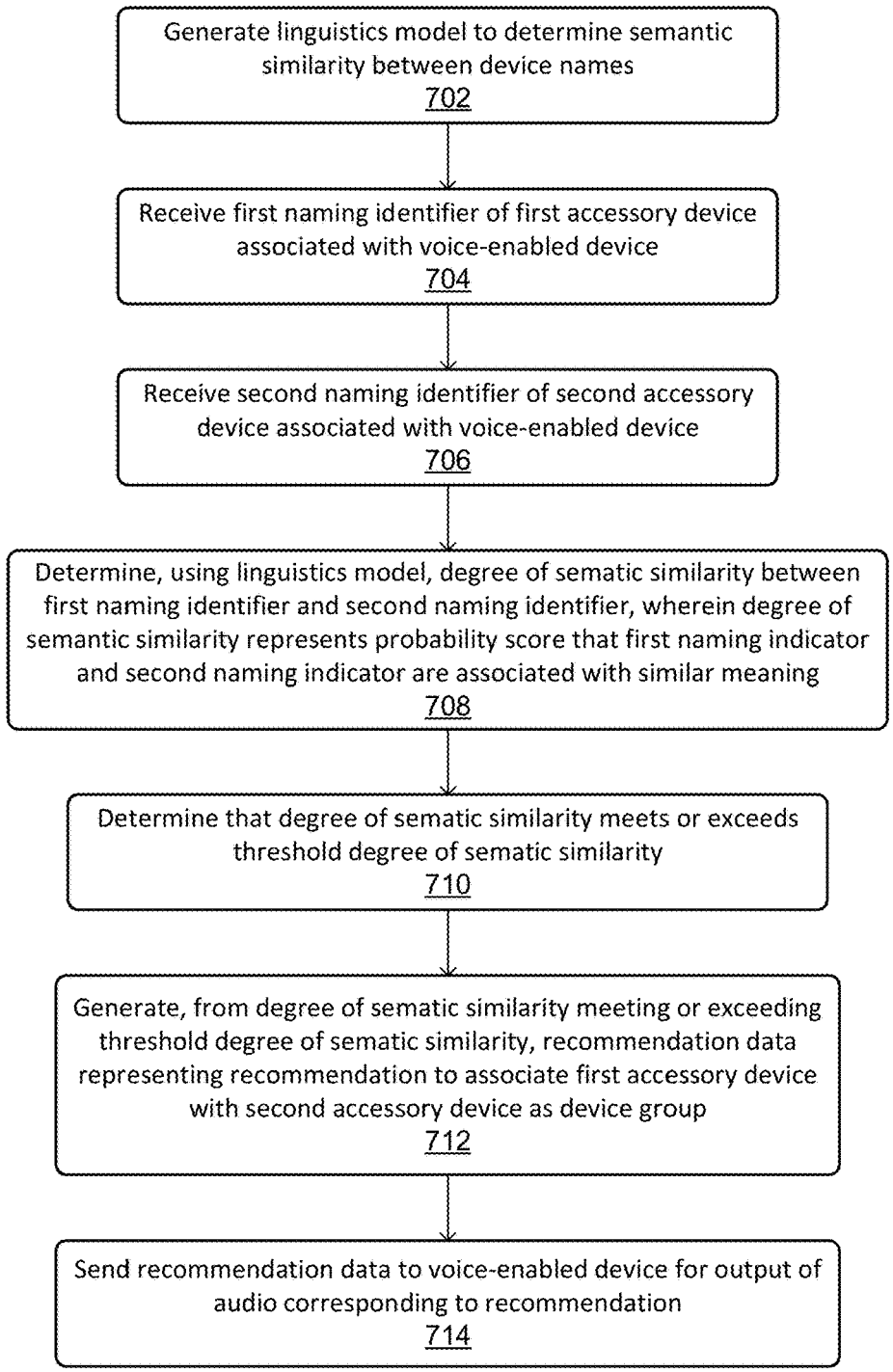
FIG. 7 illustrates a flow diagram of an example process for intelligent device grouping.

FIG. 7 illustrates a flow diagram of an example process 700 for intelligent device grouping. The order in which the operations or steps are described is not intended to be construed as a limitation, and any number of the described operations may be combined in any order and/or in parallel to implement process 700.

At block 702, the process 700 may include generating, via a modelling component, a linguistics model to determine semantic similarity between device names. For example, a modelling component, such as the modelling component 154 as described with respect to FIG. 1, may be configured to utilize data stored in a user registry and/or data stores to determine and/or predict useful information to be utilized by a remote system. For example, the modelling component 154 may include one or more models, such as one or more linguistics models, one or more device-activation models, and/or one or more device-affinity models. Each of these example models is described in more detail with respect to FIGS. 1, 4, and 5, above. The models described herein may be rules-based in some examples and may be generated based at least in part on machine learning techniques in other examples.

As to the linguistics models, machine learning techniques may be utilized to generate models that extract and/or utilize extracted naming indicators associated with accessory devices and calculate semantic similarity between naming indictors for devices associated with a given user profile and/or user account. The machine learning techniques may provide the ability to improve outcome prediction performance without being explicitly programmed to do so. A number of machine learning techniques may be employed to generate models. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, linear regression techniques, and/or rules-based machine learning. For example, the linguistics models may be configured and/or trained to recognize similar naming indicators associated with accessory devices, which may indicate that such accessory devices are typically used together.

At block 704, the process 700 may include receiving a first naming identifier of a first accessory device associated with a voice-enabled device. For example, a user may set up or otherwise configure an accessory device with a voice-enabled device and/or one or more other accessory devices. Additionally, or alternatively, the user may alter information associated with an accessory device. In examples, this setup process may be performed via a mobile-device application stored on and/or accessible to the personal device. During the setup process, the user may provide a naming indicator for the accessory device, which may be stored in association with the user registry and/or the data stores. For example, an application may be installed and/or accessed from a user's personal device. During setup of the accessory device, the application may allow for a user interface to display a field for entering a name of the accessory device. The user may provide input, such as via selection of presented letters on a keyword. Input data corresponding to the user input may be generated and sent to the remote system. The remote system may determine at least a portion of the input data as text data representing the naming indicator for the accessory device and may store that text data in association with a user account associated with the voice-enabled device and/or the user.

At block 706, the process 700 may include receiving a second naming identifier of a second accessory device associated with the voice-enabled device. Receiving the second naming identifier may be performed in the same or a similar manner as receiving the first naming identifier, as described with respect to block 704.

At block 708, the process 700 may include determining, using the linguistics model, a degree of sematic similarity between the first naming identifier and the second naming identifier. The degree of semantic similarity may represent a probability score that the first naming indicator and the second naming indicator are associated with a similar meaning. For example, a naming indicator of "living room lamp A" and "living room lamp B" have a high degree of semantic similarity. A probability score indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models may also be configured and/or trained to recognize semantic differences in device naming indicators to identify similarities. For example, a device with a naming indicator of "couch lamp" and another device with a naming indicator of "sofa lamp" may be analyzed by the linguistics models to determine that "couch" and "sofa" are frequently used interchangeably, universally and/or with respect to a given user profile and/or user account.

At block 710, the process 700 may include determining that the degree of sematic similarity meets or exceeds a threshold degree of sematic similarity. For example, a threshold probability score may be identified, determined, and/or generated, and results from the linguistics models may be analyzed with respect to the threshold probability to determine whether, for a given device pair, a grouping recommendation should be presented to the user and/or a device group should be created. By way of example, a threshold probability score may be set at 0.9. In examples, the first accessory device may be associated with a naming indicator of "office overhead light" while the second accessory device may be associated with a naming indicator of "office lamp." A device pair may be identified, determined, and/or generated for each of the accessory devices. For example, a first device pair may correspond to the first accessory device and the second accessory device. The naming indicators associated with the accessory devices may be analyzed, using the linguistics models, to determine a probability score for the device pair. In the example used herein, a high probability score may be determined for the device pair given the semantic similarity between "office overhead light" and "office lamp." For example, the linguistics models may determine that both naming indicators utilize the word "office" and, while the remaining words are not the same "overhead light" has a degree of semantic similarity with "lamp." Based at least in part on the analysis described above, it may be determined that the probability score for the device pair exceeds the threshold probability score, which may result in a determination that a grouping recommendation should be generated and/or sent.

At block 712, the process 700 may include generating, from the degree of sematic similarity meeting or exceeding the threshold degree of sematic similarity, recommendation data representing a recommendation to associate the first accessory device with the second accessory device as a device group. For example, a modelling component may call and/or otherwise cause a grouping-recommendation component to generate the recommendation data based at least in part on determining that a recommendation should be presented. The modelling component and/or the grouping-recommendation component may identify the accessory devices to be associated with each other and may identify naming indicators associated with those accessory devices. The recommendation data may be generated and may represent a recommendation to associate the accessory devices and/or an indication of which devices are to be associated with each other. The recommendation data may correspond to and/or include audio data representing audio to be output by one or more devices, such as the voice-enabled device.

At block 714, the process 700 may include sending the recommendation data to the voice-enabled device for output of audio corresponding to the recommendation. For example, the recommendation data and/or directive data may be sent to the voice-enabled device, which may output the audio, via the speakers. An example of output audio may be "would you like to group Light 1 and Light 2?" The recommendation data may correspond to and/or include text data representing text to be presented by one or more devices, such as the personal device and/or the voice-enabled device. For example, the recommendation data and/or directive data may be sent to the personal device and/or the voice-enabled device, which may present the text, such as via the displays.

Additionally, or alternatively, the process 700 may include identifying a first number of times the first accessory device has been controlled by the voice-enabled device and a second number of times the first accessory device has been controlled by another voice-enabled device. These operations may be repeated for one or more other accessory devices. The process 700 may also include determining that the number of times a given accessory device has been controlled by a given voice-enabled device is at least a threshold amount more than other voice-enabled devices. In these examples, generating the recommendation data may include generating the recommendation data in response to the number of times being at least the threshold amount more than other voice-enabled devices. This process may be performed using one or more device-affinity models, wherein rules-based and/or machine learning techniques may be utilized to generate models that extract and/or utilize device affinity information associated with a frequency at which an accessory device is caused to operate by given voice-enabled devices. For example, the environment may include two or more voice-enabled devices, say one in an office and one in a kitchen. The office voice-enabled device may be frequently utilized to operate certain accessory devices, such as, for example, the first accessory device and the second accessory device. The bedroom voice-enabled device may be frequently utilized to operate other accessory devices. The device-affinity models may determine a frequency at which such voice-enabled devices are utilized to operate the accessory devices. In examples where at least two of the accessory devices are operated from a given voice-enabled device, those accessory devices may be candidates for addition to a preexisting device group and/or for generation of a new device group. By way of example, device-affinity data may be stored in the user registry and/or the data stores and may be received by the device-affinity models for identifying which accessory devices are operated by which voice-enabled devices and frequencies associated with such operations.

By way of example, a control rate may be identified for each pair of voice-enabled device and accessory device. A control rate may be determined for the interactions between some or each accessory device and some or each voice-enabled device. For example, a control rate of 0.9 may be determined for the interaction of the first accessory device with the first voice-enabled device. A control rate of 0.1 may be determined for the interaction of the first accessory device with the second voice-enabled device. Likewise, a control rate of 0.8 may be determined for the interaction of the second accessory device with the first voice-enabled device, while a control rate of 0.2 may be determined for the interaction of the second accessory device with the second voice-enabled device. In this example, the device-affinity models may determine that the first accessory device and the second accessory device are frequently controlled by the first voice-enabled device, making those accessory devices candidates for inclusion in a device group. In examples, a threshold control rate may be established and may be utilized to determine if an accessory device is controlled by a particular voice-enabled device with enough frequency to make the accessory device a candidate for inclusion in the device group.

Additionally, or alternatively, the process 700 may include identifying first words associated with the first naming indicator and identifying second words associated with the second naming indicator. The process 700 may also include determining that a word is included in the first words and that the word is included in the second words. The process 700 may also include generating recommendation data representing a recommendation to associate the device group with a name including the word and sending the recommendation data to the voice-enabled device.

Additionally, or alternatively, the process 700 may include determining, using historical usage data, that the first accessory device and the second accessory device are operated together at at least a threshold frequency and causing the first accessory device and the second accessory device to be associated as the device group. The process 700 may also include determining, using the historical usage data, a group-name indicator to associate with the device group. The process 700 may also include receiving audio data representing a user utterance provided to the voice-enabled device and determining, from the audio data, that the user utterance includes the group-name indicator. The process 700 may also include sending directive data to the voice-enabled device directing the voice-enabled device to cause the first accessory device and the second accessory device to perform an action.

Figure 8:
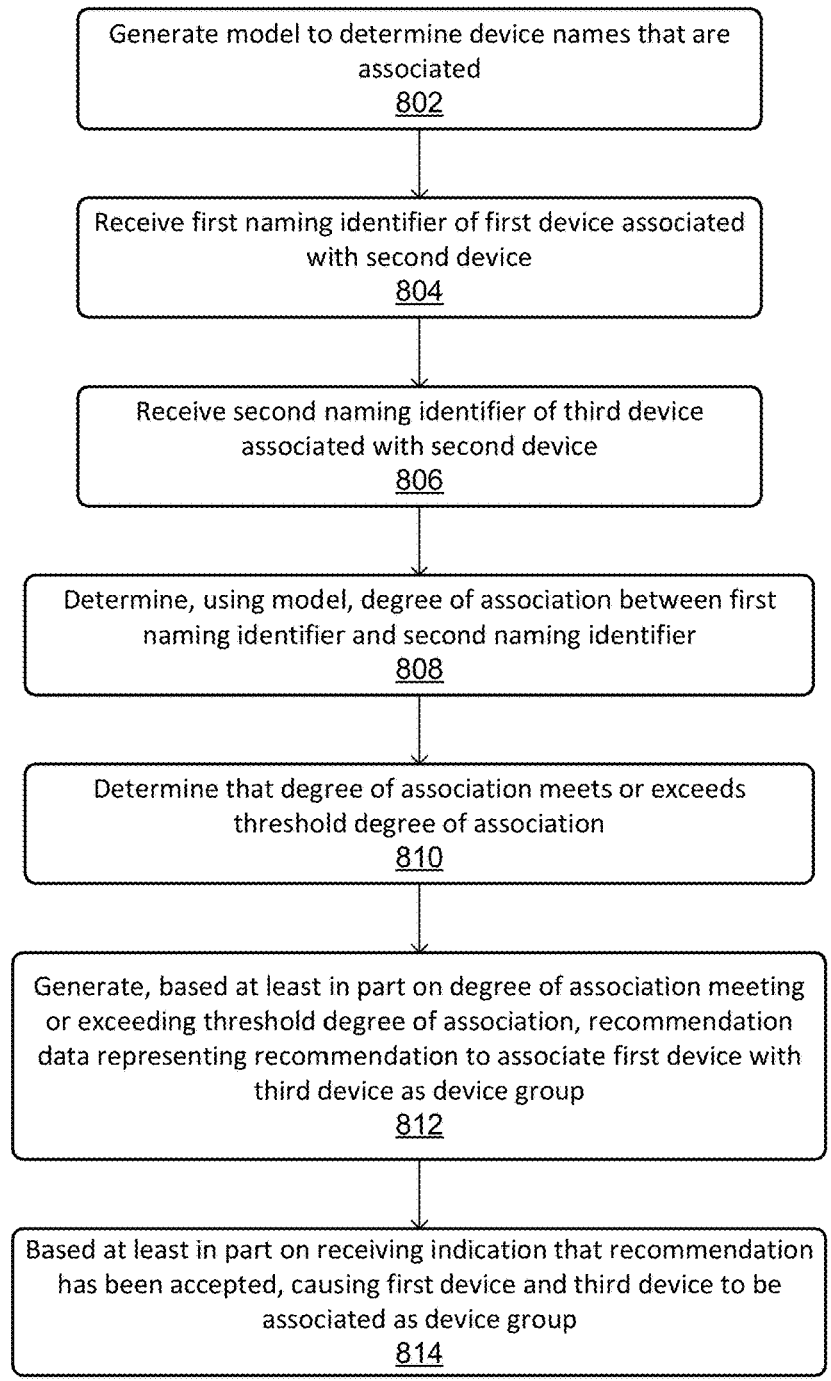
FIG. 8 illustrates a flow diagram of another example process for intelligent device grouping.

FIG. 8 illustrates a flow diagram of another example process 800 for intelligent device grouping. The order in which the operations or steps are described is not intended to be construed as a limitation, and any number of the described operations may be combined in any order and/or in parallel to implement process 800.

At block 802, the process 800 may include generating a model to determine device names that are associated. For example, a modelling component may be configured to utilize data stored in a user registry and/or data stores to determine and/or predict useful information to be utilized by a remote system. For example, the modelling component may include one or more models, such as one or more linguistics models, one or more device-activation models, and/or one or more device-affinity models. The models described herein may be rules-based in some examples and may be generated based at least in part on machine learning techniques in other examples.

As to the linguistics models, machine learning techniques may be utilized to generate models that extract and/or utilize extracted naming indicators associated with accessory devices and calculate semantic similarity between naming indictors for devices associated with a given user profile and/or user account. For example, the linguistics models may be configured and/or trained to recognize similar naming indicators associated with accessory devices, which may indicate that such accessory devices are typically used together.

At block 804, the process 800 may include receiving a first naming identifier of a first device associated with a second device. For example, a user may set up or otherwise configure an accessory device, here the first device, with a voice-enabled device, her the second device, and/or one or more other accessory devices. Additionally, or alternatively, the user may alter information associated with an accessory device. In examples, this setup process may be performed via a mobile-device application stored on and/or accessible to the personal device. During the setup process, the user may provide a naming indicator for the accessory device, which may be stored in association with the user registry and/or the data stores.

At block 806, the process 800 may include receiving a second naming identifier of a third device associated with the second device. Receiving the second naming identifier may be performed in the same or a similar manner as receiving the first naming identifier, as described with respect to block 804.

At block 808, the process 800 may include determining, using the model, a degree of association between the first naming identifier and the second naming identifier. For example, a naming indicator of "living room lamp A" and "living room lamp B" have a high degree of semantic similarity. A probability score indicating a probability that the two devices associated with the naming indicators are utilized together may be determined and a matrix representing pair-wised similarity between naming indicators may be generated. In examples, agglomerative clustering, also described as hierarchical clustering, may be utilized to identify, determine, and/or generate device clusters. The linguistics models may also be configured and/or trained to recognize semantic differences in device naming indicators to identify similarities. For example, a device with a naming indicator of "couch lamp" and another device with a naming indicator of "sofa lamp" may be analyzed by the linguistics models to determine that "couch" and "sofa" are frequently used interchangeably, universally and/or with respect to a given user profile and/or user account.

At block 810, the process 800 may include determining that the degree of association meets or exceeds a threshold degree of association. For example, a threshold probability score may be identified, determined, and/or generated, and results from the linguistics models may be analyzed with respect to the threshold probability to determine whether, for a given device pair, a grouping recommendation should be presented to the user and/or a device group should be created. By way of example, a threshold probability score may be set at 0.9. In examples, the first accessory device may be associated with a naming indicator of "office overhead light" while the second accessory device may be associated with a naming indicator of "office lamp." A device pair may be identified, determined, and/or generated for each pair of the accessory devices. For example, a first device pair may correspond to the first accessory device and the second accessory device. The naming indicators associated with the accessory devices may be analyzed, using the linguistics models, to determine a probability score for the device pair. In the example used herein, a high probability score may be determined for the device pair given the semantic similarity between "office overhead light" and "office lamp." For example, the linguistics models may determine that both naming indicators utilize the word "office" and, while the remaining words are not the same "overhead light" has a degree of semantic similarity with "lamp." Based at least in part on the analysis described above, it may be determined that the probability score for the device pair exceeds the threshold probability score, which may result in a determination that a grouping recommendation should be generated and/or sent.

At block 812, the process 800 may include generating, based at least in part on the degree of association meeting or exceeding the threshold degree of association, recommendation data representing a recommendation to associate the first device with the third device as a device group. For example, a modelling component may call and/or otherwise cause a grouping-recommendation component to generate the recommendation data based at least in part on determining that a recommendation should be presented. The modelling component and/or the grouping-recommendation component may identify the accessory devices to be associated with each other and may identify naming indicators associated with those accessory devices. The recommendation data may be generated and may represent a recommendation to associate the accessory devices and/or an indication of which devices are to be associated with each other. The recommendation data may correspond to and/or include audio data representing audio to be output by one or more devices, such as the voice-enabled device.

At block 814, the process 800 may include causing the first device and the third device to be associated as a device group. Causing the first device and the third device to be associated as a device group may be based at least in part on receiving an indication that the recommendation has been accepted. For example, a user may provide a user utterance indicating acceptance of the recommendation and/or the user may provide input to a personal device and corresponding input data may indicate acceptance of the recommendation.

Additionally, or alternatively, the process 800 may include identifying a first number of times the first device has been controlled by the second device and a second number of times the first device has been controlled by a third device, such as another voice-enabled device. These operations may be repeated for one or more other accessory devices. The process 800 may also include determining that the number of times a given accessory device has been controlled by a given voice-enabled device is at least a threshold amount more than other voice-enabled devices. In these examples, generating the recommendation data may include generating the recommendation data in response to the number of times being at least the threshold amount more than other voice-enabled devices. This process may be performed using one or more device-affinity models, wherein rules-based and/or machine learning techniques may be utilized to generate models that extract and/or utilize device affinity information associated with a frequency at which an accessory device is caused to operate by given voice-enabled devices. For example, the environment may include two or more voice-enabled devices, say one in an office and one in a kitchen. The office voice-enabled device may be frequently utilized to operate certain accessory devices, such as, for example, the first accessory device and the second accessory device. The bedroom voice-enabled device may be frequently utilized to operate other accessory devices. The device-affinity models may determine a frequency at which such voice-enabled devices are utilized to operate the accessory devices. In examples where at least two of the accessory devices are operated from a given voice-enabled device, those accessory devices may be candidates for addition to a preexisting device group and/or for generation of a new device group. By way of example, device-affinity data may be stored in the user registry and/or the data stores and may be received by the device-affinity models for identifying which accessory devices are operated by which voice-enabled devices and frequencies associated with such operations.

By way of example, a control rate may be identified for each pair of voice-enabled device and accessory device. A control rate may be determined for the interactions between some or each accessory device and some or each voice-enabled device. For example, a control rate of 0.9 may be determined for the interaction of the first accessory device with the first voice-enabled device. A control rate of 0.1 may be determined for the interaction of the first accessory device with the second voice-enabled device. Likewise, a control rate of 0.8 may be determined for the interaction of the second accessory device with the first voice-enabled device, while a control rate of 0.2 may be determined for the interaction of the second accessory device with the second voice-enabled device. In this example, the device-affinity models may determine that the first accessory device and the second accessory device are frequently controlled by the first voice-enabled device, making those accessory devices candidates for inclusion in a device group. In examples, a threshold control rate may be established and may be utilized to determine if an accessory device is controlled by a particular voice-enabled device with enough frequency to make the accessory device a candidate for inclusion in the device group.

Additionally, or alternatively, the process 800 may include identifying first words associated with the first naming indicator and identifying second words associated with the second naming indicator. The process 800 may also include determining that a word is included in the first words and that the word is included in the second words. The process 800 may also include generating recommendation data representing a recommendation to associate the device group with a name including the word and sending the recommendation data to the voice-enabled device.

Additionally, or alternatively, the process 800 may include determining, using historical usage data, that the first device and the third device are operated together at at least a threshold frequency and causing the first device and the third device to be associated as the device group. The process 800 may also include determining, using the historical usage data, a group-name indicator to associate with the device group. The process 800 may also include receiving audio data representing a user utterance provided to the voice-enabled device and determining, from the audio data, that the user utterance includes the group-name indicator. The process 800 may also include sending directive data to the voice-enabled device directing the voice-enabled device to cause the first device and the third device to perform an action.

Additionally, or alternatively, the process 800 may include generating directive data representing a directive to output, by a speaker of the second device, audio representing the recommendation and receiving an indication that the user is interacting with the second device. The process 800 may include sending, based at least in part on receiving the indication, the directive data to the second device. The process 800 may also include receiving audio data from the second device and determining that the audio data indicates a response to the recommendation indicating an intent to associate the first device and the third device as the device group. The process 800 may also include causing the first device and the third device to be associated as the device group.

Additionally, or alternatively, the process 800 may include generating notification data representing a notification to be presented by a display of a mobile device associated with the second device, the notification associated with the recommendation. The process 800 may also include sending the notification data to the mobile device and receive input data from the mobile device. The input data may correspond to input received by the mobile device indicating an intent to associate the first device and the third device as the device group. The process 800 may also include causing the first device and the third device to be associated as the device group.

Additionally, or alternatively, the process 800 may include determining, based at least in part on historic use data, that the first device is operated during a first period of time of a day and determining that the third device is operated during a second period of time of the day. The process 800 may also include determining that the first period of time overlaps at least partially with the second period of time. In these examples, generating the recommendation data may be based at least in part on determining that the first period of time overlaps at least partially with the second period of time.

Additionally, or alternatively, the process 800 may include receiving response data representing a response to the recommendation. The response may indicate confirmation of an intent to associate the first device and the third device. The process 800 may also include associating, based at least in part on the response data, a user profile associated with the second device with a recommendation group. The process 800 may also include causing the model to utilize a parameter associated with the recommendation group for a subsequent recommendation. The parameter may indicate an accuracy of the recommendation.

Figure 9:
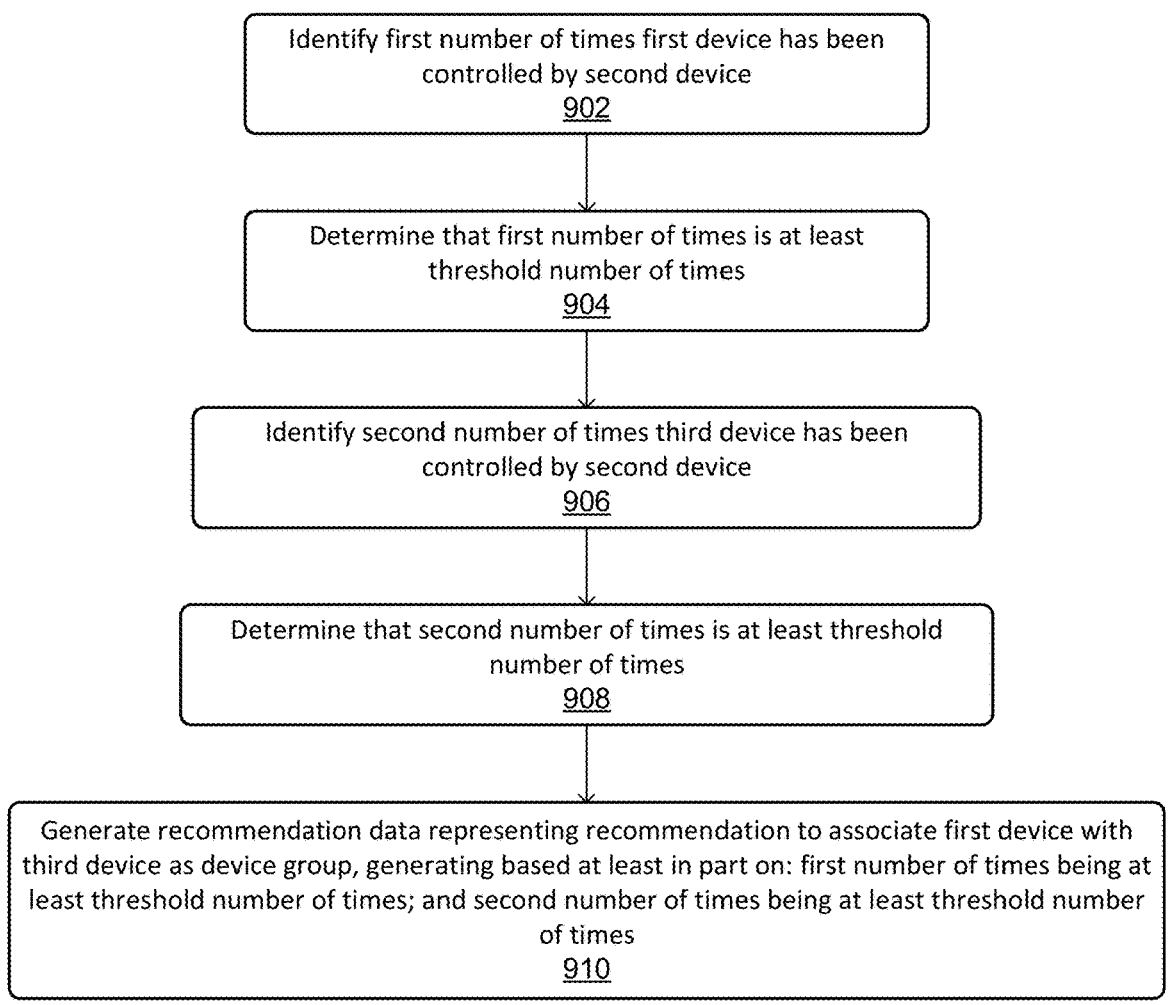
FIG. 9 illustrates a flow diagram of another example process for intelligent device grouping.

FIG. 9 illustrates a flow diagram of another example process 900 for intelligent device grouping. The order in which the operations or steps are described is not intended to be construed as a limitation, and any number of the described operations may be combined in any order and/or in parallel to implement process 900.

At block 902, the process 900 may include identifying a first number of times a first device has been controlled by a second device. For example, an environment may include two or more voice-enabled devices, say one in an office and one in a kitchen. The office voice-enabled device may be frequently utilized to operate certain accessory devices. The bedroom voice-enabled device may be frequently utilized to operate other accessory devices, such as, for example, the first accessory device and the second accessory device. Device-affinity data may be stored in a user registry and/or data stores and may be received by device-affinity models for identifying which accessory devices are operated by which voice-enabled devices and frequencies associated with such operations.

At block 904, the process 900 may include determining that the first number of times is at least a threshold number of times. For example, rules-based and/or machine learning techniques may be utilized to generate models that extract and/or utilize device affinity information associated with a frequency at which an accessory device is caused to operate by given voice-enabled devices. The device-affinity models may determine a frequency at which such voice-enabled devices are utilized to operate the accessory devices. In examples where at least two of the accessory devices are operated from a given voice-enabled device, those accessory devices may be candidates for addition to a preexisting device group and/or for generation of a new device group.

By way of example, a control rate may be identified for each pair of voice-enabled device and accessory device. A control rate may be determined for the interactions between some or each accessory device and some or each voice-enabled device. In examples, a threshold control rate may be established and may be utilized to determine if an accessory device is controlled by a particular voice-enabled device with enough frequency to make the accessory device a candidate for inclusion in the device group.

At block 906, the process 900 may include identifying a second number of times the third device has been controlled by the second device. Identifying the second number of times may be performed in the same or a similar manner as identifying the first number of times, as described with respect to block 902.

At block 908, the process 900 may include determining that the second number of times is at least the threshold number of times. This determination may be performed in the same or a similar manner as the determination made with respect to block 904.

At block 910, the process 900 may include generating recommendation data representing a recommendation to associate the first device with the third device as a device group, the generating based at least in part on: the first number of times being at least the threshold number of times; and the second number of times being at least the threshold number of times. Recommendation data may be generated and may represent a recommendation to associate the accessory devices and/or an indication of which devices are to be associated with each other. The recommendation data may correspond to and/or include audio data representing audio to be output by one or more devices, such as the voice-enabled device. For example, the recommendation data and/or directive data may be sent to the voice-enabled device, which may output the audio. An example of output audio may be "would you like to group Office Light and Office Lamp?" The recommendation data may correspond to and/or include text data representing text to be presented by one or more devices, such as the personal device and/or the voice-enabled device. For example, the recommendation data and/or directive data may be sent to the personal device and/or the voice-enabled device, which may present the text.

Additionally, or alternatively, the process 900 may include generating a model to determine similarities between device names and receiving naming identifiers for the first device and the fourth device. The process 900 may also include determining, using the model, a degree of similarities between the naming identifiers and determining that the degree of similarity meets or exceeds a threshold degree of similarity. In these examples, generating the recommendation data may be based at least in part on the degree of similarity meeting or exceeding the threshold degree of similarity.

Additionally, or alternatively, the process 900 may include identifying first words associated with the first naming indicator and identifying second words associated with the second naming indicator. The process 900 may also include determining that a word is included in the first words and that the word is included in the second words. The process 900 may also include generating recommendation data representing a recommendation to associate the device group with a name including the word and sending the recommendation data to the voice-enabled device.

Additionally, or alternatively, the process 900 may include determining, using historical usage data, that the first device and the fourth device are operated together at at least a threshold frequency and causing the first device and the fourth device to be associated as the device group. The process 900 may also include determining, using the historical usage data, a group-name indicator to associate with the device group. The process 900 may also include receiving audio data representing a user utterance provided to the voice-enabled device and determining, from the audio data, that the user utterance includes the group-name indicator. The process 900 may also include sending directive data to the voice-enabled device directing the voice-enabled device to cause the first device and the fourth device to perform an action.

Additionally, or alternatively, the process 900 may include generating directive data representing a directive to output, by a speaker of the second device, audio representing the recommendation and receiving an indication that the user is interacting with the second device. The process 900 may include sending, based at least in part on receiving the indication, the directive data to the second device. The process 900 may also include receiving audio data from the second device and determining that the audio data indicates a response to the recommendation indicating an intent to associate the first device and the fourth device as the device group. The process 900 may also include causing the first device and the fourth device to be associated as the device group.

Additionally, or alternatively, the process 900 may include generating notification data representing a notification to be presented by a display of a mobile device associated with the second device, the notification associated with the recommendation. The process 900 may also include sending the notification data to the mobile device and receive input data from the mobile device. The input data may correspond to input received by the mobile device indicating an intent to associate the first device and the fourth device as the device group. The process 900 may also include causing the first device and the fourth device to be associated as the device group.

Additionally, or alternatively, the process 900 may include determining, based at least in part on historic use data, that the first device is operated during a first period of time of a day and determining that the fourth device is operated during a second period of time of the day. The process 900 may also include determining that the first period of time overlaps at least partially with the second period of time. In these examples, generating the recommendation data may be based at least in part on determining that the first period of time overlaps at least partially with the second period of time.

Additionally, or alternatively, the process 900 may include receiving response data representing a response to the recommendation. The response may indicate confirmation of an intent to associate the first device and the fourth device. The process 900 may also include associating, based at least in part on the response data, a user profile associated with the second device with a recommendation group. The process 900 may also include causing the model to utilize a parameter associated with the recommendation group for a subsequent recommendation. The parameter may indicate an accuracy of the recommendation.

Figure 10:
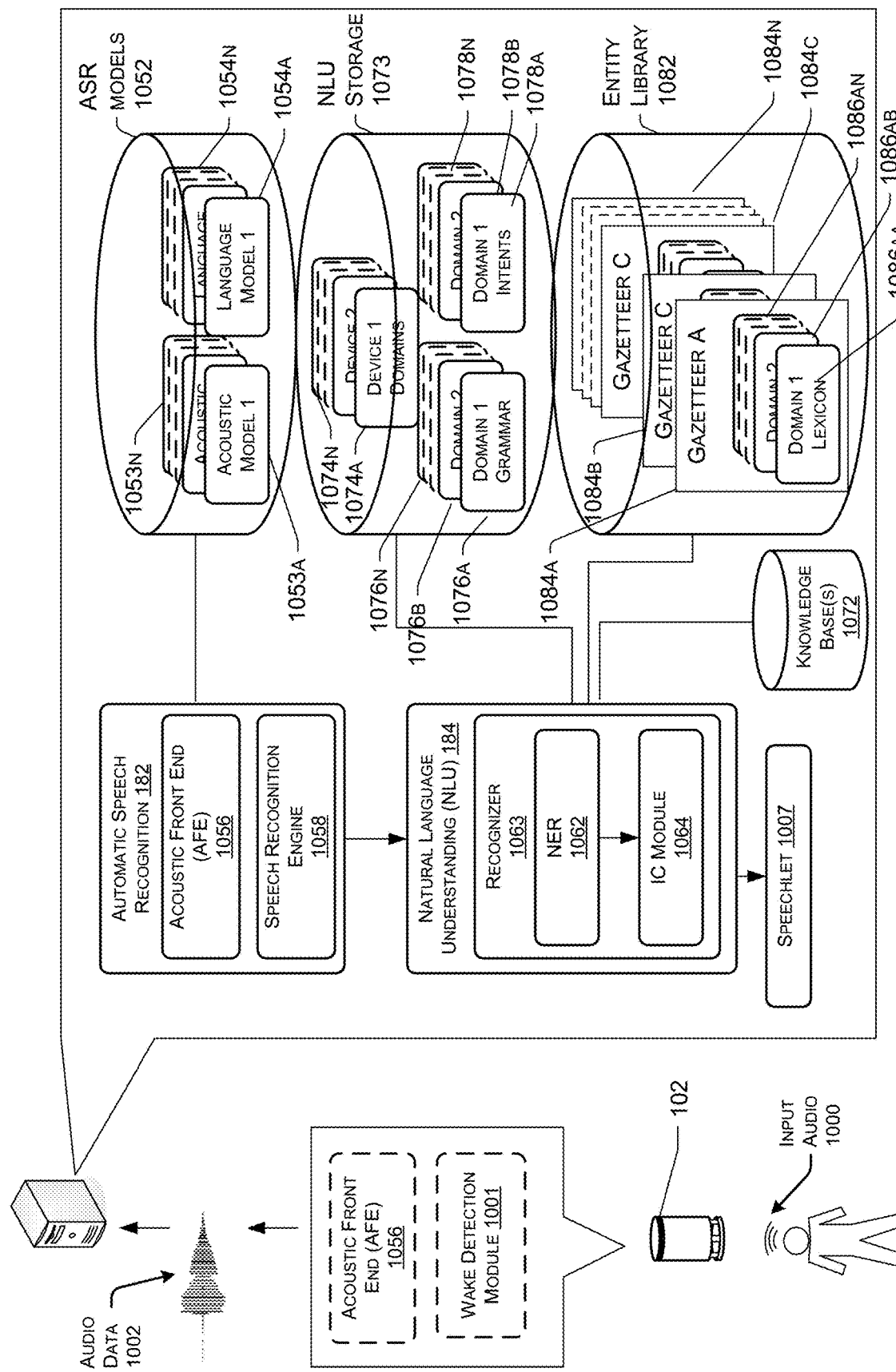
FIG. 10 illustrates a conceptual diagram of components of a speech processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 110). The various components illustrated may be located on a same or different physical devices. Message between various components illustrated in FIG. 10 may occur directly or across a network 112. An audio capture component, such as a microphone 120 of the device 102, or another device, captures audio 1000 corresponding to a spoken utterance. The device 102, using a wakeword detection module 1001, then processes audio data corresponding to the audio 1000 to determine if a keyword (such as a wakeword) is detected in the audio data. Following detection of a wakeword, the device 102 sends audio data 1002 corresponding to the utterance to the remote system 110 that includes an ASR module 182. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR module 182 of the remote system 110.

The wakeword detection module 1001 works in conjunction with other components of the user device, for example a microphone to detect keywords in audio 1000. For example, the device may convert audio 1000 into audio data, and process the audio data with the wakeword detection module 1001 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wakeword detection module 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1002 corresponding to input audio 1000 to the remote system 110 for speech processing. Audio data corresponding to that audio may be sent to remote system 110 for routing to a recipient device or may be sent to the remote system 110 for speech processing for interpretation of the included speech (either for purposes of enabling voice-messages and/or for purposes of executing a command in the speech). The audio data 1002 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 110, an ASR module 182 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054 stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053 stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 182 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056) and transmit that information to a server across a network for ASR processing. Feature vectors may arrive at the remote system 110 encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, turn on lights." The wake detection module may identify the wake word, otherwise described as a trigger expression, "Alexa," in the user utterance and may "wake" based on identifying the wake word. Audio data corresponding to the user utterance may be sent to the remote system 110, where the speech recognition engine 1058 may identify, determine, and/or generate text data corresponding to the user utterance, here "turn on lights."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 110, for natural language understanding (NLU) processing, such as conversion of the text into commands for execution, either by the user device, by the remote system 110, or by another device (such as a server running a specific application like a search engine, etc.).

The device performing NLU processing 184 (e.g., server 110) may include various components, including potentially dedicated processor(s), memory, storage, etc. As shown in FIG. 10, an NLU component 184 may include a recognizer 1063 that includes a named entity recognition (NER) module 1062 which is used to identify portions of query text that correspond to a named entity that may be recognizable by the system. A downstream process called named entity resolution links a text portion to a specific entity known to the system. To perform named entity resolution, the system may utilize gazetteer information (1084a-1084n) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 182 based on the utterance input audio 1000) and attempts to make a semantic interpretation of the text. That is, the NLU process determines the meaning behind the text based on the individual words and then implements that meaning. NLU processing 184 interprets a text string to derive an intent or a desired action from the user as well as the pertinent pieces of information in the text that allow a device (e.g., device 102) to complete that action. For example, if a spoken utterance is processed using ASR 182 and outputs the text "turn on lights" the NLU process may determine that the user intended to establish to operate or otherwise turn on one or more devices with a naming indicator of "lights."

The NLU may process several textual inputs related to the same utterance. For example, if the ASR 182 outputs N text segments (as part of an N-best list), the NLU may process all N outputs to obtain NLU results.

As will be discussed further below, the NLU process may be configured to parse and tag to annotate text as part of NLU processing. For example, for the text "turn on Office Light," "turn on" may be tagged as a command (to activate a device) and "Office Light" may be tagged as the naming identifier of the device with which to activate.

To correctly perform NLU processing of speech input, an NLU process 184 may be configured to determine a "domain" of the utterance so as to determine and narrow down which services offered by the endpoint device (e.g., remote system 110 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 1062 receives a query in the form of ASR results and attempts to identify relevant grammars and lexical information that may be used to construe meaning. To do so, the NLU module 184 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "smart home," "communications," "shopping," "music," "calendaring," etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) module 1064 parses the query to determine an intent or intents for each identified domain, where the intent corresponds to the action to be performed that is responsive to the query. Each domain is associated with a database (1078a-1078n) of words linked to intents. For example, a smart home intent database may link words and phrases such as "turn on," "activate," "on," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC module 1064 identifies potential intents for each identified domain by comparing words in the query to the words and phrases in the intents database 1078. In some instances, the determination of an intent by the IC module 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC module 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on Office Light" is an identified intent, a grammar (1076) framework or frameworks may correspond to sentence structures such as "turn on {Office Light}."

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for the intent of "play a song," meanwhile, may specify a list of slots/fields applicable to play the identified "song" and any object modifier (e.g., specifying a music collection from which the song should be accessed) or the like. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER module 1062 may search the database of generic words associated with the domain (in the knowledge base 1072). So, for instance, if the query was "turn on Office Light," after failing to determine which device to operate, the NER component 1062 may search the domain vocabulary for the phrase "Office Light". In the alternative, generic words may be checked before the gazetteer information, or both may be tried, potentially producing two different results.

The output data from the NLU processing (which may include tagged text, commands, etc.) may then be sent to a speechlet 1007. The destination speechlet 1007 may be determined based on the NLU output. For example, if the NLU output includes a command to send a message, the destination speechlet 1007 may be a message sending application, such as one located on the user device or in a message sending appliance, configured to execute a message sending command. If the NLU output includes a search request, the destination speechlet 1007 may include a search engine processor, such as one located on a search server, configured to execute a search command. After the appropriate command is generated based on the intent of the user, the speechlet 1007 may provide some or all of this information to a text-to-speech (TTS) engine. The TTS engine may then generate an actual audio file for outputting the audio data determined by the speechlet 1007 (e.g., "okay," or "we couldn't find Office Light"). After generating the file (or "audio data"), the TTS engine may provide this data back to the remote system 110. In examples where the intent is associated with operation of smart-home devices, a smart-home system may be called to perform operations. In these examples, a smart-home speechlet may be configured to generate directive data representing directives for operation of smart-home devices, such as via voice-enabled devices and/or hub devices associated with the accessory devices. The smart-home speechlet may communicate with an internet-of-things component, which may be utilized to identify accessory devices associated with voice-enabled devices and/or determine which accessory device(s) are associated with the intent data. The smart-home speechlet and/or the internet-of-things component may determine an action to be taken with respect to an accessory device and may send corresponding data to the speech processing system 180 to assist in communications with the voice-enabled device. For example, directive data may be sent using the speech processing system 180 and/or audio data generated by a TTS component 186 may be sent to voice-enabled devices to output audio representing responses to user utterances.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 184 during runtime operations where NLU operations are performed on text (such as text output from an ASR component 182). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC module 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 110 may include a model training component. The model training component may be used to train the classifier(s)/machine learning models discussed above.

As noted above, multiple devices may be employed in a single speech processing system. In such a multi-device system, each of the devices may include different components for performing different aspects of the speech processing. The multiple devices may include overlapping components. The components of the user device and the remote system 110, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
computer-readable media storing computer-executable instructions that, when executed by the one or more processors, cause the one or more processors to perform operations comprising:
generating a linguistics model to determine semantic similarity between device names, the linguistics model configured to utilize first data indicating semantic similarities of the device names across multiple user accounts;
receiving a first naming identifier of a first accessory device associated with a voice-enabled device;
receiving a second naming identifier of a second accessory device associated with the voice-enabled device;
determining, using the linguistics model, a degree of semantic similarity between the first naming identifier and the second naming identifier, wherein the linguistics model:

determines a matrix of probabilities across devices associated with the voice-enabled device, the matrix of probabilities indicating semantic similarity probabilities for device pairs of the devices; and
determines which of the device pairs indicate the most semantic similarity;
determining that a device pair corresponding to the first naming identifier and the second naming identifier is at least one of the device pairs indicated as the most semantically similar; and
based at least in part on the device pair being the at least one of the device pairs indicated as the most semantically similar, causing the first accessory device and the second accessory device to be associated as a device group.

2. The system of claim 1, the operations further comprising:
identifying a first number of times the first accessory device has been controlled by the voice-enabled device;
determining that the first number of times is at least a threshold amount of times;
identifying a second number of times the second accessory device has been controlled by the voice-enabled device;
determining that the second number of times is at least the threshold amount of times; and
wherein causing the first accessory device and the second accessory device to be associated as the device group is in response to the first number of times being at least the threshold amount of times and the second number of times being at least the threshold amount of times.

3. The system of claim 1, the operations further comprising:
identifying first words associated with the first naming indicator;
identifying second words associated with the second naming indicator;
determining that a word is included in the first words and in the second words;
generating recommendation data representing a recommendation to associate the device group with a name including the word; and
sending the recommendation data to the voice-enabled device.

4. The system of claim 1, the operations further comprising:
determining, using historical usage data, that the first accessory device and the second accessory device are operated together at least a threshold number of times;
determining, using the historical usage data, a group-name indicator to associate with the device group;
receiving audio data representing a user utterance provided to the voice-enabled device;
determining, from the audio data, that the user utterance includes the group-name indicator; and
sending directive data to the voice-enabled device directing the voice-enabled device to cause the first accessory device and the second accessory device to perform an action.

5. The system of claim 1, the operations further comprising:
generating, utilizing agglomerative clustering, second data indicating clusters of the device pairs;
determining that the device pair is part of a cluster of the clusters, the cluster including other device pairs associated with the device group; and wherein causing the first accessory device and the second accessory device to be associated as a device group is based at least in part on the device pair being part of the cluster.

6. A method, comprising:
receiving audio data representing user utterances captured by a voice interface device;
generating first data indicating directives sent to at least one of the voice interface device or devices associated with user account data, the directives causing the devices to perform actions responsive to the user utterances;
storing use data indicating when the devices associated with user account data are operated responsive to the directives;
determining, utilizing a model, that a first device and a second device of the devices have been operated together in response to speech input received at the voice interface device;
generating second data representing a recommendation to associate the first device with the second device as a device group; and
generating the device group including a first identifier of the first device and a second identifier of the second device.

7. The method of claim 6, further comprising:
identifying a first number of times the first device has been controlled by the voice interface device;
determining that the first number of times is at least a threshold number of times;
identifying a second number of times the second device has been controlled by the voice interface device;
determining that the second number of times is at least the threshold number of times; and
wherein generating the second data comprises generating the second data based at least in part on:
the first number of times being at least the threshold number of times; and
the second number of times being at least the threshold number of times.

8. The method of claim 6, further comprising:
identifying first words associated with a first naming indicator of the first device;
identifying second words associated with a second naming indicator of the second device;
determining a word that is included in the first words and in the second words;
generating, based at least in part on determining that the word is included in the first words and the second words, recommendation data representing a recommendation to associate the device group with an identifier including the word; and
sending the recommendation data to the voice interface device.

9. The method of claim 6, further comprising:
determining a group-name indicator to associate with the device group;
determining that a user utterance includes the group-name indicator; and
sending directive data to the voice interface device directing the voice interface device to cause the first device and the second device to perform an action.

10. The method of claim 6, further comprising:
generating notification data representing a notification to be presented by a display of a mobile device associated with the voice interface device, the notification associated with the recommendation;
sending the notification data to the mobile device; and
receiving input data from the mobile device, the input data corresponding to input received by the mobile device representing the indication that the recommendation has been accepted.

11. The method of claim 6, further comprising:
receiving response data representing a response to the recommendation, the response indicating confirmation of an intent to associate the first device and the second device;
associating, based at least in part on the response data, a user profile associated with the second device with a recommendation group; and
causing the model to utilize a parameter associated with the recommendation group for a subsequent recommendation, the parameter indicating an accuracy of the recommendation.

12. The method of claim 6, wherein the model comprises a first model, and the method further comprises:
determining, using a second model, a degree of semantic similarity between a first naming identifier of the first device and a second naming identifier of the voice interface device;
determining, utilizing a third model, data representing rates at which the third device is utilized to control devices associated with user account data, the devices including the first device and the second device; and
wherein causing the first device and the second device to be associated as the device group is based at least in part on output from the first model, the second model, and the third model.

13. A system comprising:
one or more processors; and
computer-readable media storing computer-executable instructions that, when executed by the one or more processors, cause the one or more processors to perform operations comprising:
receiving audio data representing user utterances captured by a voice interface device;
generating first data representing directives to control devices responsive to the user utterances;
identifying a first number of times a first device of the devices has been controlled by the voice interface device;
identifying a second number of times a second device has been controlled by the voice interface device;
determining, utilizing a model, second data representing rates at which the voice interface device is utilized to control the devices associated with user account data, the devices including the first device and the second device;
determining, based at least in part on the first number of times and the second data, that the voice interface device is utilized to control the first device more than one or more other devices associated with the user account data;
determining, based at least in part on the second number of times and the second data, that the voice interface device is utilized to control the second device more than the one or more other devices associated with the user account data; and
causing the first device and the second device to be associated as a device group based at least in part on the voice interface device being utilized to control the first device and the second device more than the one or more other devices associated with the user account data.

14. The system of claim 13, the operations further comprising:
- receiving a first naming identifier of the first device;
- receiving a second naming identifier of the second device;
- determining, using a linguistics model, a degree of semantic similarity between the first naming identifier and the second naming identifier, wherein the linguistics model:
  - determines a matrix of probabilities across devices associated with the voice interface device, the matrix of probabilities indicating semantic similarity probabilities for device pairs of the devices; and
  - determines which of the device pairs indicate the most semantic similarity;
- determining that a device pair corresponding to the first naming identifier and the second naming identifier is at least one of the device pairs indicated as the most semantically similar; and
- wherein causing the first device and the second device to be associated as the device group is in response to the device pair being the at least one of the device pairs indicated as the most semantically similar.

15. The system of claim 14, the operations further comprising:
- identifying first words associated with the first naming indicator;
- identifying second words associated with the second naming indicator;
- determining that a word is included in the first words and in the second words;
- generating, based at least in part on determining that the word is included in the first words and the second words, recommendation data representing a recommendation to associate the device group with an identifier including the word; and
- sending the recommendation data to the voice interface device.

16. The system of claim 13, the operations further comprising:
- determining a group-name indicator to associate with the device group;
- determining that a user utterance includes the group-name indicator; and
- sending directive data to the voice interface device directing the voice interface device to cause the first device and the second device to perform an action.

17. The system of claim 13, the operations further comprising:
- generating notification data representing a notification to be presented by a display of a mobile device associated with the voice interface device;
- sending the notification data to the mobile device;
- receiving input data from the mobile device, the input data corresponding to input received by the mobile device indicating an intent to associate the first device and the second device as the device group; and
- wherein causing the first device and the second device to be associated as the device group is based at least in part on the input data.

18. The system of claim 13, the operations further comprising:
- determining, based at least in part on use data, that the first device is operated during a first period of time of a day;
- determining, based at least in part on the use data, that the second device is operated during a second period of time of the day;
- determining that the first period of time overlaps at least partially with the second period of time; and
- wherein causing the first device and the second device to be associated as the device group is based at least in part on determining that the first period of time overlaps at least partially with the second period of time.

19. The system of claim 13, the operations further comprising:
- receiving response data representing a response to a recommendation to associate the first device and the second device as the device group, the response indicating confirmation of an intent to associate the first device and the second device;
- associating, based at least in part on the response data, a user profile associated with the voice interface device with a recommendation group; and
- causing the model to utilize a parameter associated with the recommendation group for a subsequent recommendation, the parameter indicating an accuracy of the recommendation.

* * * * *